United States Patent
Wang et al.

(10) Patent No.: US 12,554,781 B2
(45) Date of Patent: *Feb. 17, 2026

(54) SYSTEM AND METHOD FOR EFFICIENTLY DETERMINING AND DISPLAYING OPTIMAL PACKAGES OF DATA ITEMS

(71) Applicant: Palantir Technologies Inc., Denver, CO (US)

(72) Inventors: Xiangnong Wang, New York, NY (US); Yifei Huang, New York, NY (US); Michael Yang, New York, NY (US); Francis Chen, Sunnyvale, CA (US); Andy Chen, New York, NY (US); Andre Frederico Cavalheiro Menck, New York, NY (US); Christopher Yu, Culver City, CA (US); Grace Garde, South Orange, NJ (US); Mark Cinali, New York, NY (US); James Winchester, New York, NY (US); Peter Wang, Seattle, WA (US); Nitish Kulkarni, Fremont, CA (US)

(73) Assignee: Palantir Technologies Inc., Denver, CO (US)

(*) Notice: Subject to any disclaimer, the term of this patent is extended or adjusted under 35 U.S.C. 154(b) by 276 days.

This patent is subject to a terminal disclaimer.

(21) Appl. No.: 17/570,271

(22) Filed: Jan. 6, 2022

(65) Prior Publication Data

US 2022/0129508 A1  Apr. 28, 2022

Related U.S. Application Data

(63) Continuation of application No. 15/669,035, filed on Aug. 4, 2017, now Pat. No. 11,256,762.

(Continued)

(51) Int. Cl.
*G06Q 30/0242* (2023.01)
*G06F 16/951* (2019.01)
(Continued)

(52) U.S. Cl.
CPC ........ *G06F 16/951* (2019.01); *G06F 16/9577* (2019.01); *G06Q 30/0242* (2013.01); *G06Q 30/0244* (2013.01); *G06Q 30/0247* (2013.01)

(58) Field of Classification Search
CPC .......... G06Q 30/0242; G06Q 30/0244; G06Q 30/0247; G06F 16/951; G06F 16/9577
See application file for complete search history.

(56) References Cited

U.S. PATENT DOCUMENTS

| 5,418,950 A | 5/1995 | Li et al. |
| 5,428,737 A | 6/1995 | Li et al. |

(Continued)

FOREIGN PATENT DOCUMENTS

| DE | 102014103482 | 9/2014 |
| EP | 1647908 | 4/2006 |

(Continued)

OTHER PUBLICATIONS

Loc Do, Hady W. Lauw, and Ke Wang. 2015. Mining revenue-maximizing bundling configuration. Proc. VLDB Endow. 8, 5 (Jan. 2015), 593-604. https://doi.org/10.14778/2735479.2735491 (Year: 2015).*

(Continued)

*Primary Examiner* — Matthew L Hamilton
(74) *Attorney, Agent, or Firm* — Knobbe, Martens, Olson & Bear, LLP

(57) ABSTRACT

Various systems and methods for aggregating data from disparate sources to determine an optimal package of data items are disclosed. For example, the system described herein can obtain data items from various sources, aggregate (Continued)

and/or organize the data items into an optimal package based on various criteria, and present, via an interactive user interface, the optimal package. Furthermore, the interactive user interface may enable a user to adjust the criteria used to aggregate and/or organize the data items. The system may interactively re-aggregate and re-organize the data items using the adjusted criteria as the user interacts with the package via the user interface. The system and user interface may thus enable the user to optimize the packages of data items based on multiple factors quickly and efficiently.

10 Claims, 27 Drawing Sheets

Related U.S. Application Data

(60) Provisional application No. 62/371,085, filed on Aug. 4, 2016.

(51) Int. Cl.
  G06F 16/957 (2019.01)
  G06Q 30/0241 (2023.01)

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Xbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bingham | |
| 5,911,138 A | 6/1999 | Li et al. | |
| 5,918,225 A | 6/1999 | White et al. | |
| 6,208,985 B1 | 3/2001 | Krehel | |
| 6,236,994 B1 | 5/2001 | Swartz et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,338,043 B1* | 1/2002 | Miller | G06Q 30/02 705/14.69 |
| 6,643,613 B2 | 11/2003 | McGee et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,976,024 B1 | 12/2005 | Chavez et al. | |
| 6,985,882 B1* | 1/2006 | Del Sesto | G06Q 40/04 705/37 |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,661,116 B2 | 2/2010 | Slaney et al. | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger et al. | |
| 8,073,857 B2 | 12/2011 | Sreekanth | |
| 8,103,962 B2 | 1/2012 | Embley et al. | |
| 8,117,067 B2 | 2/2012 | Ketchum | |
| 8,271,328 B1 | 9/2012 | Baltz et al. | |
| 8,311,878 B2 | 11/2012 | Subramanian et al. | |
| 8,370,197 B2 | 2/2013 | Axe et al. | |
| 8,417,715 B1 | 4/2013 | Bruckhaus et al. | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 8,516,515 B2 | 8/2013 | Zigmond et al. | |
| 8,560,494 B1 | 10/2013 | Downing | |
| 8,615,430 B2 | 12/2013 | Yonezaki et al. | |
| 8,639,552 B1 | 1/2014 | Chen et al. | |
| 8,799,867 B1 | 8/2014 | Peri-Glass et al. | |
| 8,909,597 B2 | 12/2014 | Aymeloglu et al. | |
| 8,924,245 B2 | 12/2014 | Chatter et al. | |
| 8,924,429 B1 | 12/2014 | Fisher et al. | |
| 8,935,201 B1 | 1/2015 | Fisher et al. | |
| 8,935,303 B2 | 1/2015 | Karatzoglou et al. | |
| 9,031,981 B1 | 5/2015 | Potter et al. | |
| 9,105,000 B1 | 8/2015 | White et al. | |
| 9,176,966 B2 | 11/2015 | Silverstein et al. | |
| 9,292,388 B2 | 3/2016 | Fisher et al. | |
| 9,330,120 B2 | 5/2016 | Colgrove et al. | |
| 9,483,789 B1* | 11/2016 | Hanlon | G06Q 30/0631 |
| 9,501,783 B2 | 11/2016 | Hood et al. | |
| 9,595,068 B2 | 3/2017 | Tedjamulia et al. | |
| 9,652,510 B1* | 5/2017 | Huang | G06F 16/24578 |
| 10,129,346 B1* | 11/2018 | Roy | H04L 67/535 |
| 11,256,762 B1 | 2/2022 | Wang et al. | |
| 2002/0184111 A1 | 12/2002 | Swanson | |
| 2003/0004770 A1 | 1/2003 | Miller et al. | |
| 2003/0023485 A1 | 1/2003 | Newsome | |
| 2003/0023620 A1 | 1/2003 | Trotta | |
| 2003/0074252 A1 | 4/2003 | Chandler-Pepelnjak et al. | |
| 2003/0105833 A1 | 6/2003 | Daniels | |
| 2004/0088177 A1 | 5/2004 | Travis et al. | |
| 2004/0093286 A1* | 5/2004 | Cooper | G06Q 10/087 705/28 |
| 2004/0098731 A1 | 5/2004 | Demsey et al. | |
| 2004/0103088 A1 | 5/2004 | Cragun et al. | |
| 2004/0126840 A1 | 7/2004 | Cheng et al. | |
| 2004/0139212 A1 | 7/2004 | Mukherjee et al. | |
| 2004/0153837 A1 | 8/2004 | Preston et al. | |
| 2004/0167676 A1 | 8/2004 | Mizumaki | |
| 2004/0193608 A1 | 9/2004 | Gollapudi et al. | |
| 2005/0004911 A1 | 1/2005 | Goldberg et al. | |
| 2005/0021397 A1 | 1/2005 | Cui et al. | |
| 2005/0120080 A1 | 6/2005 | Weinreb et al. | |
| 2005/0183005 A1 | 8/2005 | Denoue et al. | |
| 2005/0226473 A1 | 10/2005 | Ramesh | |
| 2005/0278286 A1 | 12/2005 | Djugash et al. | |
| 2006/0004740 A1 | 1/2006 | Dettinger et al. | |
| 2006/0026063 A1 | 2/2006 | Collins | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0209085 A1 | 9/2006 | Wong et al. | |
| 2006/0271884 A1 | 11/2006 | Hurst | |
| 2006/0288046 A1 | 12/2006 | Gupta et al. | |
| 2007/0005582 A1 | 1/2007 | Navratil et al. | |
| 2007/0027756 A1 | 2/2007 | Collins et al. | |
| 2007/0027757 A1 | 2/2007 | Collins et al. | |
| 2007/0027851 A1 | 2/2007 | Kruy et al. | |
| 2007/0094248 A1 | 4/2007 | Mcveigh et al. | |
| 2007/0113164 A1 | 5/2007 | Hansen et al. | |
| 2007/0150805 A1 | 6/2007 | Misovski | |
| 2007/0156673 A1 | 7/2007 | Maga | |
| 2007/0168336 A1 | 7/2007 | Ransil et al. | |
| 2007/0178501 A1 | 8/2007 | Rabinowitz et al. | |
| 2007/0185867 A1 | 8/2007 | Maga | |
| 2007/0192281 A1 | 8/2007 | Cradick et al. | |
| 2007/0260582 A1 | 11/2007 | Liang | |
| 2008/0126226 A1 | 5/2008 | Popkiewicz et al. | |
| 2008/0126344 A1 | 5/2008 | Hoffman et al. | |
| 2008/0126951 A1 | 5/2008 | Sood et al. | |
| 2008/0155440 A1 | 6/2008 | Trevor et al. | |
| 2008/0162277 A1* | 7/2008 | Moonka | G06Q 30/0277 705/37 |
| 2008/0196016 A1 | 8/2008 | Todd | |

(56) References Cited

U.S. PATENT DOCUMENTS

| | | |
|---|---|---|
| 2008/0201313 A1 | 8/2008 | Dettinger et al. |
| 2008/0215543 A1 | 9/2008 | Huang et al. |
| 2008/0267386 A1 | 10/2008 | Cooper |
| 2008/0270398 A1 | 10/2008 | Landau et al. |
| 2009/0006150 A1 | 1/2009 | Prigge et al. |
| 2009/0007056 A1 | 1/2009 | Prigge et al. |
| 2009/0037267 A1 | 2/2009 | Duggal et al. |
| 2009/0043762 A1 | 2/2009 | Shiverick et al. |
| 2009/0055375 A1* | 2/2009 | Oestlien ............... G06F 16/958 707/999.005 |
| 2009/0055487 A1 | 2/2009 | Moraes et al. |
| 2009/0083275 A1 | 3/2009 | Jacob et al. |
| 2009/0094217 A1 | 4/2009 | Dettinger et al. |
| 2009/0144747 A1 | 6/2009 | Baker |
| 2009/0161147 A1 | 6/2009 | Klave |
| 2009/0172674 A1 | 7/2009 | Bobak et al. |
| 2009/0187556 A1 | 7/2009 | Ross et al. |
| 2009/0193012 A1 | 7/2009 | Williams |
| 2009/0199047 A1 | 8/2009 | Vaitheeswaran et al. |
| 2009/0248478 A1 | 10/2009 | Duggal et al. |
| 2009/0248721 A1 | 10/2009 | Burton et al. |
| 2009/0262892 A1* | 10/2009 | Haras ............... A61B 6/032 378/65 |
| 2009/0282068 A1 | 11/2009 | Shockro et al. |
| 2009/0299830 A1 | 12/2009 | West et al. |
| 2010/0011282 A1 | 1/2010 | Dollard et al. |
| 2010/0036718 A1 | 2/2010 | Hamilton et al. |
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0040634 A1* | 2/2011 | Landsberry ...... H04N 21/26225 705/14.69 |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0218955 A1 | 9/2011 | Tang |
| 2011/0252282 A1 | 10/2011 | Meek et al. |
| 2011/0258216 A1 | 10/2011 | Supakkul et al. |
| 2011/0270871 A1 | 11/2011 | He et al. |
| 2011/0295649 A1 | 12/2011 | Fine |
| 2011/0321008 A1 | 12/2011 | Jhoney et al. |
| 2012/0036007 A1 | 2/2012 | Robertson et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2012/0290448 A1 | 11/2012 | England et al. |
| 2012/0330752 A1 | 12/2012 | Kim |
| 2013/0024268 A1 | 1/2013 | Manickavelu |
| 2013/0024731 A1 | 1/2013 | Shochat et al. |
| 2013/0054306 A1 | 2/2013 | Bhalla |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0110746 A1 | 5/2013 | Ahn |
| 2013/0185245 A1 | 7/2013 | Anderson |
| 2013/0187926 A1 | 7/2013 | Silverstein |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2013/0247095 A1 | 9/2013 | Weihs et al. |
| 2013/0305278 A1 | 11/2013 | Gordon et al. |
| 2014/0012886 A1 | 1/2014 | Downing et al. |
| 2014/0074591 A1 | 3/2014 | Allen et al. |
| 2014/0074888 A1 | 3/2014 | Potter et al. |
| 2014/0100944 A1 | 4/2014 | Zhu et al. |
| 2014/0108074 A1 | 4/2014 | Miller et al. |
| 2014/0108097 A1* | 4/2014 | Gange ............... G06Q 30/0206 705/7.35 |
| 2014/0115589 A1 | 4/2014 | Marinelli, III et al. |
| 2014/0115610 A1 | 4/2014 | Marinelli, III et al. |
| 2014/0143252 A1 | 5/2014 | Silverstein et al. |
| 2014/0214579 A1 | 7/2014 | Shen et al. |
| 2014/0244388 A1 | 8/2014 | Manouchehri et al. |
| 2015/0112641 A1 | 4/2015 | Faraj |
| 2015/0269030 A1 | 9/2015 | Fisher et al. |
| 2016/0012481 A1 | 1/2016 | Elvekrog et al. |
| 2016/0026923 A1 | 1/2016 | Erenrich et al. |
| 2016/0078551 A1* | 3/2016 | Samuels ............... G06Q 40/08 705/4 |
| 2016/0088333 A1 | 3/2016 | Bhatia et al. |
| 2016/0104067 A1* | 4/2016 | Xu ............... H04L 67/306 706/46 |
| 2017/0026678 A1* | 1/2017 | Smith ............... H04N 21/482 |
| 2017/0034593 A1 | 2/2017 | Ray et al. |
| 2017/0310884 A1* | 10/2017 | Li ............... H04N 23/64 |
| 2017/0325005 A1 | 11/2017 | Liassides et al. |

FOREIGN PATENT DOCUMENTS

| | | |
|---|---|---|
| EP | 2634745 | 9/2013 |
| EP | 2743839 | 6/2014 |
| EP | 2778986 | 9/2014 |
| EP | 2921975 | 9/2015 |
| GB | 2366498 | 3/2002 |
| GB | 2508503 | 1/2015 |
| GB | 2508293 | 4/2015 |
| HK | 1194178 | 9/2015 |
| NZ | 622485 | 3/2015 |
| NZ | 616212 | 5/2015 |
| NZ | 616299 | 7/2015 |
| WO | WO 2000/034895 | 6/2000 |
| WO | WO 2010/030917 | 3/2010 |
| WO | WO 2013/030595 | 3/2013 |

OTHER PUBLICATIONS

"A Quick Guide to UniProtKB Swiss-Prot & TrEMBL," Sep. 2011, pp. 2.

"A Tour of Pinboard," <http://pinboard.in/tour> as printed May 15, 2014 in 6 pages.

Alur et al., "Chapter 2: IBM InfoSphere DataStage Stages," IBM InfoSphere DataStage Data Flow and Job Design, Jul. 1, 2008, pp. 35-137.

Anonymous, "Frequently Asked Questions about Office Binder 97," http://web.archive.org/web/20100210112922/http://support.microsoft.com/kb/843147 printed Dec. 18, 2006 in 5 pages.

Bae et al., "Partitioning Algorithms for the Computation of Average Iceberg Queries," DaWak 2000, LNCS 1874, pp. 276_286.

Ballesteros et al., "Batching: A Design Pattern for Efficient and Flexible Client/Server Interaction," Transactions on Pattern Languages of Programming, Springer Berlin Heildeberg, 2009, pp. 48-66.

Bogle et al., "Reducing Cross-Domain Call Overhead Using Batched Futures," SIGPLAN No. 29, 10 (Oct. 1994) pp. 341-354.

Bogle, Phillip Lee, "Reducing Cross-Domain Call Overhead Using Batched Futures," May 1994, Massachusetts Institute of Technology, pp. 96.

Bouajjani et al., "Analysis of Recursively Parallel Programs," PLDI09: Proceedings of the 2009 ACM Sigplan Conference on Programming Language Design and Implementation, Jun. 15-20, 2009, Dublin, Ireland, pp. 203-214.

Canese et al., "Chapter 2: PubMed: The Bibliographic Database," The NCBI Handbook, Oct. 2002, pp. 1-10.

Chazelle et al., "The Bloomier Filter: An Efficient Data Structure for Static Support Lookup Tables," SODA '04 Proceedings of the Fifteenth Annual ACM-SIAM Symposium on Discrete Algorithms, 2004, pp. 30-39.

(56) References Cited

OTHER PUBLICATIONS

Delcher et al., "Identifying Bacterial Genes and Endosymbiont DNA with Glimmer," BioInformatics, vol. 23, No. 6, 2007, pp. 673-679.
Delicious, <http://delicious.com/> as printed May 15, 2014 in 1 page.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference.
New York, 1998, pp. 299-310.
"The FASTA Program Package," fasta-36.3.4, Mar. 25, 2011, pp. 29.
Goldstein et al., "Stacks Lazy Threads: Implementing a Fast Parallel Call," Journal of Parallel and Distributed Computing, Jan. 1, 1996, pp. 5-20.
Han et al., "Efficient Computation of Iceberg Cubes with Complex Measures," ACM Sigmod, May 21-24, 2001, pp. 1-12.
Ivanova et al., "An Architecture for Recycling Intermediates in a Column-Store," Proceedings of the 35th Sigmod International Conference on Management of Data, Sigmod '09, Jun. 29, 2009, p. 309.
Jacques, M., "An extensible math expression parser with plug-ins," Code Project, Mar. 13, 2008. Retrieved on Jan. 30, 2015 from the internet: <http://www.codeproject.com/Articles/7335/An-extensible-math-expression-parser-with-plug-ins>.
Jenks et al., "Nomadic Threads: A Migrating Multithreaded Approach to Remote Memory Accesses in Multiprocessors," Parallel Architectures and Compilation Techniques, 1996, Oct. 20, 1996, pp. 2-11.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Karp et al., "A Simple Algorithm for Finding Frequent Elements in Streams and Bags," ACM Transactions on Database Systems, vol. 28, No. 1, Mar. 2003, pp. 51Ð55.
Kitts, Paul, "Chapter 14: Genome Assembly and Annotation Process," The NCBI Handbook, Oct. 2002, pp. 1-21.
Leela et al., "On Incorporating Iceberg Queries in Query Processors," Technical Report, TR-2002-01, Database Systems for Advanced Applications Lecture Notes in Computer Science, 2004, vol. 2973.
Liu et al., "Methods for Mining Frequent Items in Data Streams: An Overview," Knowledge and Information Systems, vol. 26, No. 1, Jan. 2011, pp. 1-30.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sigrist, et al., "PROSITE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), ÊAcitrezza, Catania, Italy, Sep. 29-Oct. 3, 2008, pp. 16.
Stamos et al., "Remote Evaluation," Journal ACM Transactions on Programming Languages and Systems (TOPLAS) vol. 12, Issue 4, Oct. 1990, pp. 537-564.
Wang et al., "Distributed Collaborative Filtering for Peer-to-Peer File Sharing Systems," Proceedings of the 2006 ACM Symposium on Applied Computing, pp. 1026-1030; SAC'Apr. 23-27, 06, 2006.
Wikipedia, "Machine Code", p. 1-5, printed Aug. 11, 2014.
Wollrath et al., "A Distributed Object Model for the Java System," Proceedings of the 2nd Conference on USENEX, Conference on Object-Oriented Technologies (COOTS), Jun. 17, 1996, pp. 219-231.
Notice of Acceptance for New Zealand Patent Application No. 616212 dated Jan. 23, 2015.
Notice of Acceptance for New Zealand Patent Application No. 616299 dated Apr. 7, 2015.
Notice of Acceptance for New Zealand Patent Application No. 622485 dated Nov. 24, 2014.
Notice of Allowance for U.S. Appl. No. 13/657,635 dated Jan. 29, 2016.
Notice of Allowance for U.S. Appl. No. 13/767,779 dated Mar. 17, 2015.
Notice of Allowance for U.S. Appl. No. 14/019,534 dated Feb. 4, 2016.
Notice of Allowance for U.S. Appl. No. 14/254,757 dated Sep. 10, 2014.
Notice of Allowance for U.S. Appl. No. 14/254,773 dated Aug. 20, 2014.
Notice of Allowance for U.S. Appl. No. 14/304,741 dated Apr. 7, 2015.
Notice of Allowance for U.S. Appl. No. 14/581,902 dated Nov. 13, 2015.
Official Communication for Australian Patent Application No. 2013237658 dated Feb. 2, 2015.
Official Communication for Australian Patent Application No. 2013237710 dated Jan. 16, 2015.
Official Communication for Australian Patent Application No. 2014201580 dated Feb. 27, 2015.
Official Communication for Canadian Patent Application No. 2807899 dated Jul. 20, 2015.
Official Communication for Canadian Patent Application No. 2807899 dated Oct. 24, 2014.
Official Communication for Canadian Patent Application No. 2828264 dated Apr. 28, 2015.
Official Communication for Canadian Patent Application No. 2829266 dated Apr. 28, 2015.
Official Communication for European Patent Application No. 13157474.1 dated Oct. 30, 2015.
Official Communication for European Patent Application No. 14159175.0 dated Jul. 17, 2014.
Official Communication for European Patent Application No. 14159175.0 dated Feb. 4, 2016.
Official Communication for European Patent Application No. 14159629.6 dated Sep. 22, 2014.
Official Communication for European Patent Application No. 14159629.6 dated Jul. 31, 2014.
Official Communication for European Patent Application No. 15159520.4 dated Jul. 15, 2015.
Official Communication for German Patent Application No. 10 2013 221 052.3 dated Mar. 24, 2015.
Official Communication for German Patent Application No. 10 2013 221 057.4 dated Mar. 23, 2015.
Official Communication for Great Britain Patent Application No. 1404574.4 dated Dec. 18, 2014.
Official Communication for Netherlands Patent Application No. 2011613 dated Aug. 13, 2015.
Official Communication for Netherlands Patent Application No. 2011627 dated Aug. 14, 2015.
Official Communication for Netherlands Patent Application No. 2012437 dated Sep. 18, 2015.
Official Communication for New Zealand Patent Application No. 622414 dated Mar. 24, 2014.
Official Communication for New Zealand Patent Application No. 622484 dated Apr. 2, 2014.
Official Communication for U.S. Appl. No. 13/411,291 dated Oct. 1, 2015.
Official Communication for U.S. Appl. No. 13/411,291 dated Jul. 15, 2015.
Official Communication for U.S. Appl. No. 13/608,864 dated Mar. 17, 2015.

(56) References Cited

OTHER PUBLICATIONS

Official Communication for U.S. Appl. No. 13/608,864 dated Jun. 8, 2015.
Official Communication for U.S. Appl. No. 13/657,635 dated Mar. 30, 2015.
Official Communication for U.S. Appl. No. 13/657,635 dated Oct. 7, 2015.
Official Communication for U.S. Appl. No. 13/657,656 dated May 6, 2015.
Official Communication for U.S. Appl. No. 13/657,656 dated Oct. 7, 2014.
Official Communication for U.S. Appl. No. 13/827,627 dated Mar. 2, 2015.
Official Communication for U.S. Appl. No. 13/827,627 dated Oct. 20, 2015.
Official Communication for U.S. Appl. No. 13/827,627 dated Dec. 22, 2015.

* cited by examiner

Name: 123
Historical Name: 123 15-16
Advertiser: ABC 15-16 Budget $10,000,000
4Q $3,000,000
1Q $2,500,000
2Q $1,800,000
3Q $2,700,000

16-17 Budget $10,000,000
4Q $3,000,000
1Q $2,500,000
2Q $1,800,000
3Q $2,700,000

Demo P18-49

Stream A1

GENERATE & SAVE

SET RATE OF CHANGE AND OVERRIDE INDEX

NEGOTIATED RATE OF CHANGE: 10.00%

OVERRIDE BASELINE INDEX: YES NO

CPM REWEIGHT CALCULATION

☐ Manually override input CPM

| QTR. | 16-17 BUDGET | 15-16 CPM | INPUT CPM | RATE OF CHANGE | 16-17 TARGET CPM |
|------|--------------|-----------|-----------|----------------|------------------|
| 4Q   | $3,000,000   | $42.15    | $42.15    | 10.00%         | $46.37           |
| 1Q   | $2,500,000   | $42.50    | $42.50    |                | $46.75           |
| 2Q   | $1,800,000   | $65.54    | $65.54    |                | $72.09           |
| 3Q   | $2,700,000   | $56.29    | $56.29    |                | $61.92           |

Annual Budget: $10,000,000                    Reweighted CPM: 48.34
                                              Annual Target CPM: $53.17

FIG. 3B

Name: 123
Historical Name: 123 15-16
Advertiser: ABC 15-16 Budget $10,000,000
4Q $3,000,000
1Q $2,500,000
2Q $1,800,000
3Q $2,700,000

16-17 Budget $10,000,000
4Q $3,000,000
1Q $2,500,000
2Q $1,800,000
3Q $2,700,000

Demo P18-49

Stream A1

FLIGHT WEEK SPECIFICATION

Weekly Units: | YES | NO |

Select Quarter: | 4Q | 1Q | 2Q | 3Q |

| Price Break | PB1 | PB1 | PB1 | PB1 | PB2 | PB2 | PB2 | PB3 | PB3 | PB3 |
|---|---|---|---|---|---|---|---|---|---|---|
| Flight Week | 09/05 | 09/12 | 09/19 | 09/26 | 10/03 | 10/10 | 10/17 | 10/24 | 10/31 | 11/07 |
| Week in Flight? | ☐ | ☑ | ☑ | ☑ | ☐ | ☑ | ☐ | ☐ | ☐ | ☐ |
| Target | 0% | 20% | 50% | 20% | 0% | 10% | 0% | 0% | 0% | 0% |
| 15-16 | 0% | 10% | 50% | 15% | 0% | 25% | 0% | 0% | 0% | 0% |

TOTAL 4Q SUM %: 100%

WEEKLY WEIGHT FLEXIBILITY
0  1  2  3  4

GENERATE & SAVE

FIG. 3D

TITLES GRID

Name: 123
Historical Name: 123 15-16
Advertiser: ABC 15-16 Budget $10,000,000
4Q $3,000,000
1Q $2,500,000
2Q $1,800,000
3Q $2,700,000

16-17 Budget $10,000,000
4Q $3,000,000
1Q $2,500,000
2Q $1,800,000
3Q $2,700,000

Demo P18-49

Stream A1

WORKING DEAL GRID

4Q | 1Q | 2Q | 3Q ← 472

Week | Price Break

| Price Break | PB1 | PB1 | PB1 | PB1 | PB2 | PB2 | PB2 | PB3 | PB3 | PB3 | Total |
|---|---|---|---|---|---|---|---|---|---|---|---|
| Flight Week | 09/05 | 09/12 | 09/19 | 09/26 | 10/03 | 10/10 | 10/17 | 10/24 | 10/31 | 11/07 | |
| Title #1, Sun. 8pm | | 1 | | | | 1 | | | | | 2 |
| Title #2, Sun. 9pm | 1 | | 1 | | | | 1 | | 1 | | 3 |
| Title #3, Sun. 10pm | 1 | | 1 | | 0.5 | | | | | | 2.5 |
| Title #4, Mon. 7pm | | 0.5 | | 1 | | | | 1 | 1 | | 3 |
| Title #5, Mon. 8pm | | | | 0.5 | 0.5 | 1 | | 1 | | | 3 |
| Title #6, Mon. 9pm | | 1 | | | | | 1 | | | 2 | |
| Title #7, Tue. 6pm | | | | 1 | | | | | | 1 | 3.5 |
| Title #7, Tue. 7pm | | | 0.5 | | | | 1 | | | 1 | 2.5 |

GENERATE & SAVE

UN-FINALIZE

FIG. 5B

TITLES GRID

Name: 123
Historical Name: 123 15-16
Advertiser: ABC 15-16 Budget $10,000,000
4Q $3,000,000
1Q $2,500,000
2Q $1,800,000
3Q $2,700,000

16-17 Budget $10,000,000
4Q $3,000,000
1Q $2,500,000
2Q $1,800,000
3Q $2,700,000

Demo P18-49

Stream A1

WORKING DEAL VS. OPTIMIZED DEAL

| | Hist. Units | Hist. % | Opt. Units | Hist. Opt. % |
|---|---|---|---|---|
| Title #1, Sun. 8pm | 1 | 1% | 2 | 2% |
| Title #2, Sun. 9pm | 3 | 3% | 3 | 3% |
| Title #3, Sun. 10pm | 0 | 0% | 2.5 | 2% |
| Title #4, Mon. 7pm | 2.5 | 2% | 3 | 3% |
| Title #5, Mon. 8pm | 3.5 | 3% | 3 | 3% |
| Title #6, Mon. 9pm | 0 | 0% | 2 | 2% |
| Title #7, Tue. 6pm | 2 | 2% | 3.5 | 3% |
| Title #7, Tue. 7pm | 2.5 | 2% | 2.5 | 2% |

*Max Units Per Selling Title:*

Type to Filter List
- Title #1
- Title #2
- Title #3
- Title #4
- Title #5

Add Selected Title(s)

GENERATE & SAVE

UN-FINALIZE

FIG. 5C

DEFINE A.D. POOL

FILTER INVENTORY

Use inventory only from the next [3 weeks ▶]

INVENTORY SELECTION

[Search for a title]

Showing impressions for [P18-34 ▶]   [A1] [A2]

| | Title | Week Start Date | Available Units | Locked Units | Impressions |
|---|---|---|---|---|---|
| ☐ | Title #1, Sun. 8pm | 2017-07-09 | 7.5 | 0 | 65 |
| ☐ | Title #2, Sun. 9pm | 2017-07-09 | 24.5 | 0 | 35 |
| ☐ | Title #3, Sun. 10pm | 2017-07-09 | 4 | 0 | 124 |
| ☐ | Title #4, Mon. 7pm | 2017-07-09 | 0 | 0 | 742 |
| ☒ | Title #5, Mon. 8pm | 2017-07-09 | 27 | 4 | 48 |
| ☒ | Title #6, Mon. 9pm | 2017-07-09 | 0 | 0 | 101 |
| ☐ | Title #7, Mon. 10pm | 2017-07-09 | 31.5 | 0 | 112 |
| ☐ | Title #8, Tues. 7pm | 2017-07-09 | 5 | 0 | 74 |
| ☐ | Title #9, Tues. 7:30pm | 2017-07-09 | 9 | 0 | 225 |
| ☒ | Title #10, Tues. 8pm | 2017-07-09 | 0 | 0 | 415 |
| ☐ | Title #11, Tues. 9pm | 2017-07-09 | 7.5 | 0 | 789 |
| ☐ | Title #12, Tues. 10pm | 2017-07-09 | 8 | 0 | 361 |
| ☐ | Title #13, Tues. 10:30pm | 2017-07-09 | 16 | 7 | 90 |

FIG. 7

SELECT DEALS TO FULFILL

Search for a deal

Channel ▶

All Conflicts ▶

Show cumulative underdelivery through 2Q ▶  2016-2017 ▶

On  Off

SELECT

| Requests | # | Year | Deal Name | Link # | AE | Demo | Stream | Conflicts | Budget | Through 2Q17 |
|---|---|---|---|---|---|---|---|---|---|---|
| ☒ ADU, Const. | 1 | 1617 | Deal #1 | 23 | J. Doe #1 | P25-49 | A1 | Auto | $350K | -564 |
| ☐ ADU, Const. | 2 | 1617 | Deal #2 | | J. Doe #1 | P25-49 | A1 | College | $110K | +278 |
| ☐ | 3 | 1617 | Deal #3 | | J. Doe #1 | P18-49 | A1 | Cell phone | $3.42M | -2,894 |
| ☒ ADU, Const. | 4 | 1617 | Deal #4 | | J. Doe #3 | P25-54 | A1 | Body | $78K | -14 |
| ☐ | 5 | 1617 | Deal #5 | | J. Doe #1 | P25-49 | A1 | Movies | $280K | -78 |
| ☐ | 6 | 1617 | Deal #6 | 147 | J. Doe #4 | M12-34 | A1 | Diaper | $1.54M | +1,235 |
| ☐ | 7 | 1617 | Deal #7 | | J. Doe #2 | P25-49 | A1 | Auto | $1.47M | -1,447 |
| ☒ ADU, Const. | 8 | 1617 | Deal #8 | | J. Doe #3 | W18-34 | A1 | Pizza | $2.11M | -9,708 |
| ☐ | 9 | 1617 | Deal #9 | | J. Doe #5 | P25-49 | A1 | Auto | $874K | -421 |
| ☐ | 10 | 1617 | Deal #10 | 857 | J. Doe #6 | P18-49 | A1 | Body | $219K | +45 |
| ☒ | 11 | 1617 | Deal #11 | | J. Doe #4 | W18-49 | A1 | Cell phone | $1.7M | +788 |
| ☐ | 12 | 1617 | Deal #12 | | J. Doe #7 | P25-49 | A1 | Diaper | $3.77M | -10,663 |
| ☐ | 13 | 1617 | Deal #13 | | J. Doe #8 | P25-54 | A1 | Beverage | $503K | +498 |
| ☐ | 14 | 1617 | Deal #14 | | J. Doe #4 | M12-34 | A1 | Home Vid. | $2.41M | +120 |
| ☐ | 15 | 1617 | Deal #15 | | J. Doe #5 | P25-49 | A1 | Toys | $178K | -6 |
| ☐ | 16 | 1617 | Deal #16 | | J. Doe #5 | P18-49 | A1 | Beverage | $2.18M | +942 |

FIG. 8

OPTIMIZE A.D. PACKAGE [Channel ▼] — 708    904    EXPORT    BUILD

DEAL #1

Advertiser: Advertiser #1
AE: J. Doe #1
CPM: --
Conflicts: Auto

Demo: P25-49
Stream: A1
Separation: 30

910

Stewardship for Link #23 — 906    Refresh

| Channel | # | Year | Deal Name | Stream | 3Q16 | 4Q16 | 1Q16 | 2Q17 | 3Q17 |
|---|---|---|---|---|---|---|---|---|---|
| #1 | 1 | 1617 | Deal #1 | A1 | -15 | -211 | -148 | -190 | -133 |
| #1 | 46 | 1617 | Deal #46 | A1 | -- | -489 | +17 | -42 | +8 |
| #1 | 78 | 1617 | Deal #78 | A1 | -- | -- | -128 | -145 | -77 |
| #1 | 94 | 1617 | Deal #94 | A1 | -- | -- | -86 | -46 | -98 |
| Total | | | | | -15 | -700 | -345 | -423 | -300 |

920

Enter Targets for Optimization

|  | Impr. | Day | Fringe | Late | Movie | Org. Ser. | Spec. | Wkd. |
|---|---|---|---|---|---|---|---|---|
| Target Entry: | 600 | 0% | 20% | 25% | 25% | 40% | 10% | 0% |
| 2Q Request: | 564 | 0% | 0% | 10% | 25% | 60% | 5% | 0% |

930

DEAL #5

DEAL #10

OPTIMIZE A.D. PACKAGE | Channel ▼ — 708  910  904  906  EXPORT  BUILD

DEAL #1
DEAL #5
DEAL #10

950
905

| | Impr. | Day | Fringe | Late | Movie | Org. Ser. | Spec. | Wkd. |
|---|---|---|---|---|---|---|---|---|
| Target Entry: | 600 | 0% | 20% | 25% | 25% | 40% | 10% | 0% |
| Build Package: | 638 | 0% | 0% | 15% | 35% | 45% | 5% | 0% |
| 2Q Request: | 564 | 0% | 0% | 10% | 25% | 60% | 5% | 0% |

*Deal Constraints*  *Current Units*  Package — 930

Lock This Package — 982

Package Details — 990
Total % Rate Card: 68%

| Selling Title | Week Start Date | Air Date | Units | Impr. | Earned Rev. |
|---|---|---|---|---|---|
| Title #1 | 2017-07-09 | 2017-07-10 | 1 | 57 | $430 |
| Title #2 | 2017-07-09 | 2017-07-10 | 3 | 123 | $1003 |

*Deal History* — 970

| J. Doe #1 | 2017-07-31 |
| Opened constraint request | |
| J. Doe #1 | 2017-07-30 |
| Opened impression request | |

SYSTEM AND METHOD FOR EFFICIENTLY DETERMINING AND DISPLAYING OPTIMAL PACKAGES OF DATA ITEMS

CROSS-REFERENCE TO RELATED APPLICATIONS

This application is a continuation of U.S. patent application Ser. No. 15/669,035, filed on Aug. 4, 2017 and entitled "SYSTEM AND METHOD FOR EFFICIENTLY DETERMINING AND DISPLAYING OPTIMAL PACKAGES OF DATA ITEMS," which claims a priority benefit under 35 U.S.C. § 119 to U.S. Provisional Patent Application No. 62/371,085, filed on Aug. 4, 2016 and entitled "SYSTEM AND METHOD FOR EFFICIENTLY DETERMINING AND DISPLAYING OPTIMAL PACKAGES OF DATA ITEMS," which are hereby incorporated by reference herein in their entireties.

TECHNICAL FIELD

The present disclosure relates to systems and techniques for accessing one or more databases, and aggregating, analyzing, and displaying data in interactive user interfaces. More specifically, the present disclosure relates to systems and techniques for determining optimal packages of data items.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Different entities may manage data that can be useful in generating packages of data items. Thus, such data items may be stored in multiple, and often incompatible, databases. Given the disparate sources of data items, it can be difficult for a user to gather such data and view the information in a user interface.

SUMMARY

The systems, methods, and devices described herein each have several aspects, no single one of which is solely responsible for its desirable attributes. Without limiting the scope of this disclosure, several non-limiting features will now be discussed briefly.

Disclosed herein are various systems and methods for aggregating data (e.g., data items) from disparate sources to determine an optimal package of data items. For example, the system described herein can obtain data items from various sources, aggregate and/or organize the data items into an optimal package based on various criteria, and present, via an interactive user interface, the optimal package. Furthermore, the interactive user interface may enable a user to adjust the criteria used to aggregate and/or organize the data items. The system may interactively re-aggregate and re-organize the data items using the adjusted criteria as the user interacts with the package via the user interface. The system and user interface may thus, according to various embodiments, enable the user to optimize the packages of data items based on multiple factors quickly and efficiently.

It has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The present disclosure describes various embodiments of interactive and dynamic user interfaces that are the result of significant development. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interface via the inputs described herein may provide an optimized display of, and interaction with, graph data, image data, and/or other data, and may enable a user to more quickly and accurately access, navigate, assess, and digest the data than previous systems.

Further, the interactive and dynamic user interfaces described herein are enabled by innovations in efficient interactions between the user interfaces and underlying systems and components. For example, disclosed herein are improved methods of receiving user inputs (including methods of interacting with, and selecting, images, graphs, and other types of data), translation and delivery of those inputs to various system components, automatic and dynamic execution of complex processes in response to the input delivery, automatic interaction among various components and processes of the system, and automatic and dynamic updating of the user interfaces (to, for example, display the relevant data from various different applications and/or data sources). The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing data aggregation and analysis technology is limited in various ways (e.g., limited in the types of applications or data sources the data may be drawn from, loss of data interactivity, etc.), and various embodiments of the disclosure provide significant improvements over such technology. Additionally, various embodiments of the present disclosure are inextricably tied to computer technology. In particular, various embodiments rely on detection of user inputs via graphical user interfaces, aggregation of data from different applications and data sources, and automatic processing, formatting, and display of the aggregated data via interactive graphical user interfaces. Such features and others (e.g., automatically determining an application or data source an inputted link is directed to, accessing the application or data source to retrieve and display the requested data, implementing interactivity of displayed data reflective of how the data would be displayed in its native application) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

One aspect of the disclosure provides a computer-implemented method for optimizing an assignment of a plurality of data units to a user comprising: receiving, from a user device over a network, a first constraint, a second constraint, and a third constraint; identifying a first data unit in the plurality of data units that satisfies the first constraint; assigning, to the user, the first data unit based on the first constraint; identifying a first set of data units in the plurality of data units that would improve, from a first level to a second level greater than the first level, a likelihood that a data item package has a characteristic that at least one of matches the second constraint within a first tolerance level or exceeds a minimum requirement of the second constraint; identifying a second set of data units in the first set of data units that would improve, from a third level to a fourth level greater than the third level, a likelihood that the data item package has a second characteristic that at least one of matches the third constraint or exceeds a minimum requirement of the third constraint; assigning, to the user, a second data unit in the second set of data units based on the second constraint and the third constraint; and transmitting, over the network, user interface data that causes the user device to display the assignment of the first data unit to the user and the assignment of the second data unit to the user.

The computer-implemented method of the preceding paragraph can include any sub-combination of the following features: where the computer-implemented method further comprises determining that a third data unit in the plurality of data units is assigned to the user, determining that the third data unit satisfies the first constraint, determining that the assignment of the first data unit to the user causes the data item package to have a first value and no assignment of the first data unit to the user causes the data item package to have a second value greater than the first value, unassigning the first data unit, and assigning a third data unit in the plurality of data units to the user in response to a determination that the assignment of the third data unit to the user causes the data item package to have a third value greater than the second value; where the first value of the data item package is based on a cost of one or more data items included in the data item package; where the computer-implemented method further comprises identifying a third set of data units in the plurality of data units that would improve, from a fifth level to a sixth level greater than the fifth level, a likelihood that the data item package has the characteristic matching the second constraint within a second tolerance level, and identifying a fourth set of data units in the third set of data units that would improve, from a seventh level to an eighth level greater than the seventh level, a likelihood that the data item package has the second characteristic matching the third constraint; where the computer-implemented method further comprises generating a notification that a value of the data item package can be improved if the first tolerance level is adjusted to the second tolerance level; where the computer-implemented method further comprises receiving, from the user device, an indication that the first tolerance level is modified to a second tolerance level, unassigning the second data unit, identifying a third set of data units in the plurality of data units that would improve, from the first level to a fifth level greater than the first level, a likelihood that the data item package has the characteristic matching the second constraint within the second tolerance level, identifying a fourth set of data units in the third set of data units that would improve, from the third level to a sixth level greater than the third level, a likelihood that the data item package has the second characteristic matching the third constraint, assigning, to the user, a third data unit in the second set of data units based on the second constraint and the third constraint, and transmitting, over the network, user interface data that causes the user device to display the assignment of the first data unit to the user and the assignment of the third data unit to the user; where the user interface data comprises a graph comparing characteristics of the data item package to one of the first constraint, the second constraint, or the third constraint; where assigning, to the user, the first data unit further comprises generating the data item package that includes the first data unit; where the first constraint comprises a percentage of data units in the data item package to be allocated to a day of the week, where the second constraint comprises a percentage of data units in the data item package to be allocated to a television title, and where the third constraint comprises a cost per milla (CPM); where the first tolerance level defines a range of percentages of data units to be allocated to the television title such that the data item package satisfies the second constraint if the characteristic of the data item package matches any percentage in the range of percentages; where the first constraint is based on a fourth constraint in an historical data item package; where the first data unit is one of an advertisement spot, a network-based advertisement, a billboard, a cover of a video game, an announcement during a sporting event, a consume product, or an insurance plan; and where the computer-implemented method further comprises determining that a third data unit in the plurality of data units is assigned to the user, determining that no assignment of the third data unit to the user causes the data item package to have a characteristic that matches the second constraint within the first tolerance level, and unassigning the third data unit.

Another aspect of the disclosure provides a system for optimizing an assignment of a plurality of data units to a user. The system comprises: a database configured to store data associated with an historical data item package; a data store configured to store computer-executable instructions; and a processor. The processor is in communication with the data store, where the computer-executable instructions, when executed, cause the processor to: receive, from a user device over a network, a first constraint, a second constraint, and a third constraint, where the first constraint is based on the historical data item package; identify a first data unit in the plurality of data units that satisfies the first constraint; assign, to the user, the first data unit based on the first constraint; identify a first set of data units in the plurality of data units that would improve, from a first level to a second level greater than the first level, a likelihood that a data item package has a characteristic that at least one of matches the second constraint within a first tolerance level or exceeds a minimum requirement of the second constraint; identify a second set of data units in the first set of data units that would improve, from a third level to a fourth level greater than the third level, a likelihood that the data item package has a second characteristic that at least one of matches the third constraint or exceeds a minimum requirement of the third constraint; assign, to the user, a second data unit in the second set of data units based on the second constraint and the third constraint; and transmit, over the network, user interface data that causes the user device to display the assignment of the first data unit to the user and the assignment of the second data unit to the user.

The system of the preceding paragraph can include any sub-combination of the following features: where the computer-executable instructions, when executed, cause the processor to further: determine that a third data unit in the plurality of data units is assigned to the user, determine that the third data unit satisfies the first constraint, determine that the assignment of the first data unit to the user causes the data item package to have a first value and no assignment of the first data unit to the user causes the data item package to have a second value greater than the first value, unassign the first data unit, and assign a third data unit in the plurality of data units to the user in response to a determination that the assignment of the third data unit to the user causes the data item package to have a third value greater than the second value; where the computer-executable instructions, when executed, cause the processor to further: identify a third set of data units in the plurality of data units that would improve, from a fifth level to a sixth level greater than the fifth level, a likelihood that the data item package has the characteristic matching the second constraint within a second tolerance level, and identify a fourth set of data units in the third set of data units that would improve, from a seventh level to an eighth level greater than the seventh level, a likelihood that the data item package has the second characteristic matching the third constraint; where the computer-executable instructions, when executed, cause the processor to further: receive, from the user device, an indication that the first tolerance level is modified to a second tolerance level, unassign the second data unit, identify a third set of data units in the plurality of data units that would improve, from the first level to a fifth level greater than the first level, a likelihood that the data item package has the characteristic matching the second constraint within the second tolerance level, identify a fourth set of data units in the third set of data units that would improve, from the third level to a sixth level greater than the third level, a likelihood that the data item package has the second characteristic matching the third constraint, assign, to the user, a third data unit in the second set of data units based on the second constraint and the third constraint, and transmit, over the network, user interface data that causes the user device to display the assignment of the first data unit to the user and the assignment of the third data unit to the user; where the first constraint comprises a percentage of data units in the data item package to be allocated to a day of the week, where the second constraint comprises a percentage of data units in the data item package to be allocated to a television title, and where the third constraint comprises a cost per milla (CPM); where the first tolerance level defines a range of percentages of data units to be allocated to the television title such that the data item package satisfies the second constraint if the characteristic of the data item package matches any percentage in the range of percentages; and where the first data unit is one of an advertisement spot, a network-based advertisement, a billboard, a cover of a video game, an announcement during a sporting event, a consume product, or an insurance plan.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 3A-3E illustrate a user interface displaying a specifications page that allows a user to set constraints for a data item package.

FIGS. 5A-5C illustrate a user interface 500 displaying an optimized deal and a working deal comparison page.

FIG. 7 illustrates a user interface 700 displaying a page that allows a user to select a pool of television titles that include advertisement spots that can be included in an audience deficiency package.

FIG. 8 illustrates a user interface 800 displaying a page that allows a user to select one or more data item packages.

FIGS. 9A-9B illustrate a user interface 900 displaying pages that allow a user to set constraints corresponding to one or more data item packages for use in generating the audience deficiency package.

FIG. 9C illustrates a user interface 950 displaying a page that allows a user to view a generated audience deficiency package and compare the generated audience deficiency package with the constraints set by the user.

DETAILED DESCRIPTION OF SPECIFIC EMBODIMENTS

Overview

Figure 1:
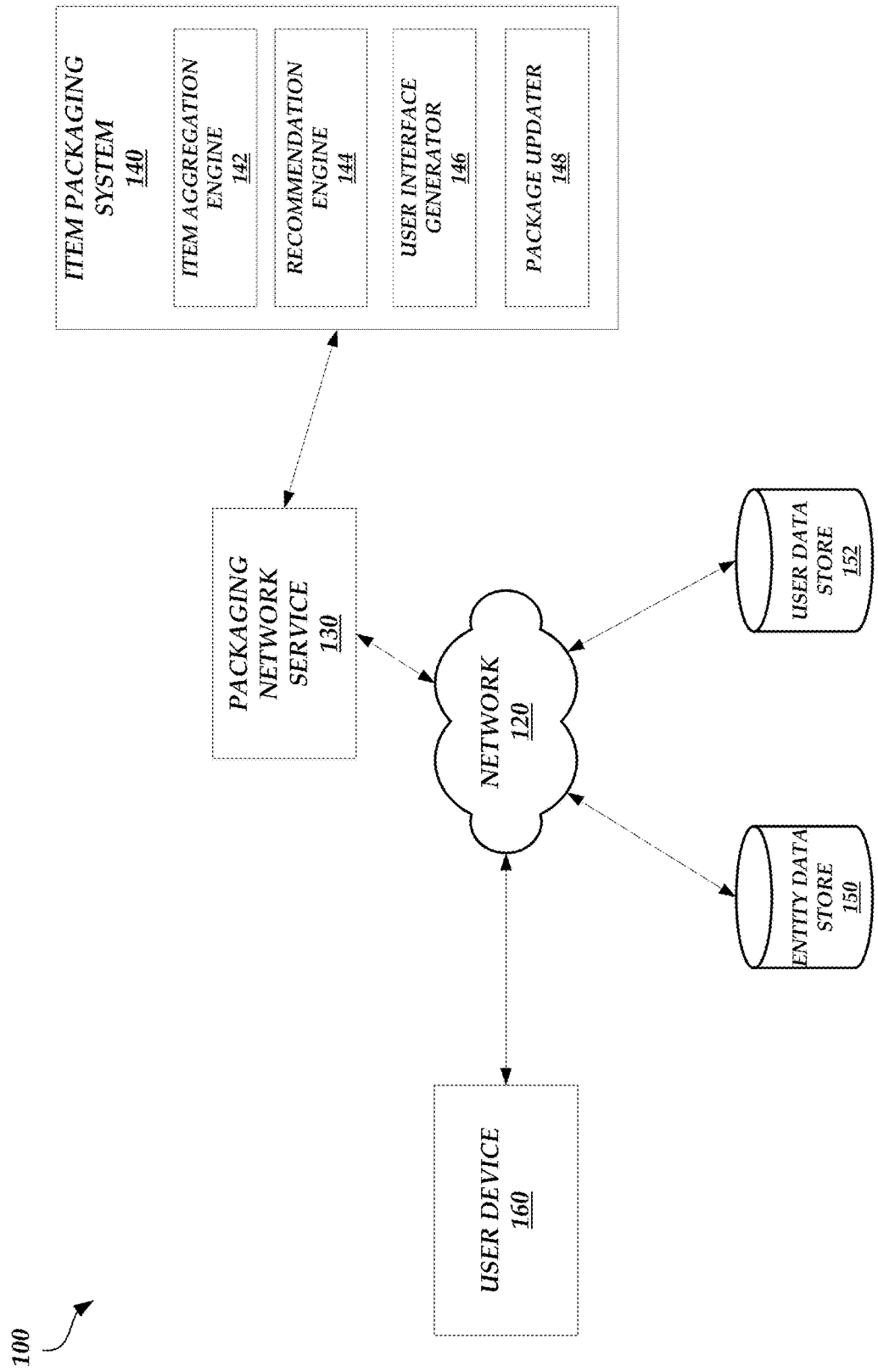
FIG. 1 illustrates an example block diagram showing the various components of a data item packaging system, in accordance with some embodiments.

As described above, disclosed herein are various systems and methods for aggregating data (e.g., data items) from disparate sources to determine an optimal package of data items. For example, the system described herein can obtain data items from various sources, aggregate and/or organize the data items into an optimal package based on various criteria, and present, via an interactive user interface, the optimal package. Furthermore, the interactive user interface may enable a user to adjust the criteria used to aggregate and/or organize the data items. The system may interactively re-aggregate and re-organize the data items using the adjusted criteria as the user interacts with the package via the user interface. The system and user interface may thus, according to various embodiments, enable the user to optimize the packages of data items based on multiple factors quickly and efficiently.

The systems and methods described herein may be applied to various fields in which data items are to be optimally packaged together. One such field is advertising, such as network-based (e.g., Internet) or television advertising, in which advertising spots (e.g., data items) are matched with advertisers (e.g., another type of data item) according to criteria or factors provided by the advertisers and the advertising spots are packaged together into a deal. An advertising spot may be a portion of a commercial break in a television show that an advertiser may purchase to advertise a product. In this field, and in other similar fields, it may be challenging to package multiple data items (e.g., advertisement spots) with changing values into a single package that meets pricing and content specifications of buyers (e.g., advertisers) while optimizing value to the seller (e.g., television networks). For example, sales account executives selling advertisement spots may need to have an understanding of the expected value of available advertisement spots. This expected value is nearly impossible for any person to discern because it is difficult to track, balance, and/or fine-tune the high number of static variables (e.g., less flexible constraints, such as advertiser budget, specified television titles to advertise within, etc.) and dynamic variables (e.g., more flexible constraints, such as cost of an advertisement spot, percentage of advertisement spots that should be associated with a group, television category, or day of the week, the number of impressions associated with a television title, etc.) that affect the expected value given the dependent nature of the variables (e.g., the variables can be highly dependent on one another such that adding a single advertisement spot to a package can impact how close one or more of the variables are to meeting their respective target). In addition, a lack of knowledge of the expected value of advertisement spots and/or of other information can contribute to perverse incentives (e.g., a desire to optimize sellability rather than satisfying sellability because it is the easiest path forward). In such a field, sales account executives do not have a robust, data-driven way of distinguishing the holistic impact of one advertisement spot from another, and generally use intuition to make decisions, leading to suboptimal results given the inability to discern expected values of advertisement spots.

The systems and methods disclosed herein help overcome these challenges by employing interactive user interfaces and aggregation and/or sorting techniques for enabling a user (e.g., an account executive at a television network, a sales representative of a manufacturing company, etc.) to efficiently package data items (e.g., television advertisement spots, network-based advertisements, billboard space, consumer products, insurance plans, etc.) in a data-driven way to, for example, optimize revenue. The systems enable aggregating, analyzing, and/or displaying data items in interactive user interfaces.

As used herein, the term "data item" is a broad term including its ordinary and customary meaning, and includes, but is not limited to, representations of any type of data that may be packaged. For example, data items may include various events (e.g., television shows, movies, advertisement spots, trade fairs, store-wide sales, product releases, etc.). Data items may be associated with one another, and further may relate to a given period of time, place, medium, and/or the like. For example, an advertisement spot may be a period of time (e.g., 15 seconds, 30 seconds, 1 minute, etc.) during a commercial break of a television show. In another example, an advertisement spot may be a portion of a television show where an advertiser may place a product, logo, etc. that may be viewed during the television show. In another example, data items may include download codes for various electronic products, reservation/confirmation codes for participating in events, purchasing products, and/or the like. Data items may represent any other relevant event or thing depending on the implementation and/or the field of application of the system.

As an example, the systems and methods described herein may employ techniques to aggregate and/or organize data items based on the value of the data items. The value of the data items may include a value attributed to the data items by an entity (e.g., a buyer, such as an advertiser) and a value attributed to the data items by a user (e.g., a seller, such as a television network). For example, an advertiser may be particularly interested in reaching a set number of viewers (e.g., a number of impressions) given a budget, and the value of the data items may therefore be the cost per impressions associated with each data item. A television network may be interested in filling as much available advertisement spot inventory as possible, and the value of the data items may therefore be the efficient allocation of data items to advertisers. The system can evaluate criteria specific to the field of application of the system (e.g., demographics, day of week, category of television show, and/or the like in the case of television advertising) to determine a package of data items that achieves an optimal value. Using the user interface and the package of data items that achieves an optimal value, the user (e.g., a seller) may be able to more effectively negotiate deals with an entity (e.g., a buyer).

Accordingly, the systems and methods described herein may provide several benefits. For example, the systems and methods described herein may allow the user to efficiently select data items, or combinations/packages of data items, that are expected to bring an optimal value to the entity (e.g., a buyer) and/or the user (e.g., a seller). As another example, the systems and methods may provide recommendations to the user that, if implemented, can improve a package of data items such that the improved package of data items is closer to achieving an optimal value. Various other benefits of the systems and methods described herein a mentioned throughout this disclosure.

As mentioned above, throughout the present disclosure advertisement spots during a television show may be used as an example of a data item. However, there may be a variety of data items that may be suitable for use with the described systems and methods. For example, suitable data items may include network-based advertisements (e.g., advertisement viewed on web pages, in web series, in social media, in mobile applications, etc.), a billboard, a cover of a video game, an announcement during a sporting event, consumer products, insurance plans, and/or the like.

Example Systems and Network Environment

FIG. 1 illustrates an example block diagram showing the various components of a data item packaging system 100, in accordance with some embodiments. As illustrated in FIG. 1, the data item packaging system 100 includes a packaging network service 130 (e.g., a web service), an item packaging system 140, an entity data store 150, a user data store 152, and a user device 160. The packaging network service 130, the entity data store 150, the user data store 152, and/or the user device 160 may communicate via a network 120.

The packaging network service 130 may be a computer program or system designed to aggregate, analyze, and/or output data for use in analysis of various information. For example, the packaging network service 130 can aggregate and/or analyze data for transmission to the item packaging system 140. Such data may be retrieved from the entity data store 150 and/or the user data store 152 via the network 120. The packaging network service 130 can then receive a data item package from the item packaging system 140 and output the data item package to the user device 160 via the network 120. In some embodiments, the packaging network service 130 and/or other components of FIG. 1 may call an application programming interface (API) to perform various functions. For example, the packaging network service 130 can call an API offered by the item packaging system 140 to receive the data item package.

The term "package," as used herein, is broad term for any data structure for storing and/or organizing data, including, but not limited to, any collection or combination of data items. In the field of television advertising, as described above, a package may be a collection of one or more spots. Additionally, in the field of manufacturing, a package may be a collection of consumer products. A package may have a related entity (e.g., a user who created the package, a user the package is recommended for, and/or the like).

One or both of the data stores 150 and 152 may be databases. For example, the entity data store 150 may store, for one or more entities (e.g., advertisers), historical data item packages determined for the respective entity. The historical data item packages can each identify which advertisement spots were assigned to the respective advertiser (e.g., advertisement spots associated with specific television titles, the number of advertisement spots, what weeks the advertisement spots fall in, etc.). The entity data store 150 can further store, for one or more advertisers, general specifications, unit specifications, rate of change data, cost per mille (CPM) data (e.g., cost per 1000 impressions, which is a price for achieving 1000 impressions of an advertisement), budget data, group data, day of week data, category data, flight week specifications, title specific targets, and/or the like. General specifications can include the name of the advertiser, a conflict code (e.g., an identification of an industry that the advertiser is in), a selected demographic (e.g., P2+(e.g., persons aged two or more), P12-34 (e.g., persons aged 12 to 34), P18-49 (e.g., persons aged 18 to 49), P18-54 (e.g., persons aged 18 to 54), A18-34 (e.g., adults aged 18-34), men 18-34 (e.g., men aged 18 to 34), women 18-34 (e.g., women aged 18-34), etc.), and/or stream data (e.g., information identifying how impressions are calculated). Unit specifications can include allowable advertisement spot lengths (e.g., 15 seconds, 30 seconds, 60 seconds, etc.), whether a 30 minute separation should be enforced (e.g., if enforced, the advertiser is not assigned an advertisement spot within 30 minutes of a previous advertisement spot assigned to the advertiser), and/or a maximum number of units per television program (e.g., the maximum number of advertisement spots that can be assigned to the advertiser within each television program). The rate of change data may indicate how a CPM should change year to year. The CPM data can include quarterly CPM data (e.g., a CPM desired by an advertiser in a quarter) and/or annual CPM data (e.g., a CPM desired by an advertiser in a year). The budget data can include quarterly budget limits and/or annual budget limits of the advertiser. The group data can indicate which grouping of shows included advertisement spots assigned to the advertiser. The day of week data can indicate the day of a week a television show aired that included advertisement spots assigned to the advertiser. The category data can indicate the category of shows that included advertisement spots assigned to the advertiser. The flight week specifications can include which weeks in a quarter advertisement spots were assigned to the advertiser and/or the percentage of advertisement spots allocated to a given week. Title specific targets can include the range of advertisement spots assigned to the advertiser that are associated with a given television title (e.g., television show) and/or the identity of television titles that have been excluded from including advertisements from the advertiser.

The user data store 152 may store data such as an available inventory of advertisement spots, a cost of each available advertisement spot, an estimated number of impressions corresponding to each available advertisement spot, an identification of one or more television titles that include available advertisement spots, data identifying when television titles will air, data identifying television title category information and/or group information, user preferences, and/or the like.

As used herein, the term "database" is a broad term for any data structure for storing and/or organizing data, including, but not limited to, relational databases (Oracle database, mySQL database, etc.), non-relational databases (for example, a NoSQL database), an in-memory database, spreadsheets, XML files, and text file, among others. The various terms "database," "storage," "data store," and "data source" may be used interchangeably in the present disclosure. Such data structures may be configured to store computer-executable instructions that may communicate with various hardware processors to cause said processors to perform various functions.

The item packaging system 140 can include various components. For example, the item packaging system 140 can include an item aggregation engine 142, a recommendation engine 144, a user interface generator 146, and a package updater 148. The item aggregation engine 142 can receive data from the entity data store 150 and/or the user data store 152 via the network 120 and the packaging network service 130. The item aggregation engine 142 can further receive input data provided by the user device 160 via the network 120 and the packaging network service 130 as described in greater detail below. The input data may include constraints that limit which advertisement spots can be assigned to an advertiser. The constraints may correspond to targets to be met. The item aggregation engine 142 can use such data to generate a data item package that can be transmitted to the user device 160 via the network 120 and the packaging network service 130.

As an example, the item aggregation engine 142 can parse the constraints provided by the user device 160 to identify constraints that are less flexible (e.g., at least one advertisement spot assigned to the advertiser must be within a commercial break of a specific television title) and constraints that are more flexible (e.g., an advertiser desires 20% of assigned advertisement spots to be in commercial breaks of comedy shows, but the advertiser will accept any percentage of assigned advertisement spots to be in commercial breaks of comedy shows). The more flexible constraints may be associated with a tolerance level that defines the flexibility of the respective constraint. Thus, the tolerance level may define a range of targets that can be met to satisfy the respective more flexible constraint. Based on the less flexible constraints, the item aggregation engine 142 may assign one or more advertisement spots to the advertiser that satisfies the less flexible constraints. In some embodiments, the item aggregation engine 142 analyzes the available advertisement spot inventory in chronological order and assigns the first advertisement spot that satisfies the less flexible constraints to the advertiser. In other embodiments, the advertisement spots in the available advertisement spot inventory are each associated with a ranked value and the item aggregation engine 142 assigns, to the advertiser, the highest ranked advertisement spot in the inventory that satisfies the less flexible constraints.

Once the less flexible constraints are satisfied based on the assignment of some advertisement spots to the advertiser, some more flexible constraints may also be satisfied (e.g., because the assignment of advertisement spots to satisfy the less flexible constraints also satisfy some more flexible constraints) and/or some more flexible constraints may still not be satisfied. For a first more flexible constraint that is still not satisfied, the item aggregation engine 142 may then filter, from the inventory of available advertisement spots, advertisement spots that would not result in the data item package coming closer to reaching the range of targets defined by the first more flexible constraint and its tolerance level. Of the remaining advertisement spots, the item aggregation engine 142 may then repeat this process for each of the remaining unsatisfied more flexible constraints. The item aggregation engine 142 can then assign advertisement spots to the advertiser, where the assigned advertisement spots are selected based on the spots' ranked value (e.g., where advertisement spots can be ranked based on how much the selection of the respective advertisement spot would result in the data item package's overall efficiency). For example, each advertisement spot may be associated with a cost and/or a number of impressions. While an advertisement spot may be associated with a cost, a price charged to the advertiser for the advertisement spot can be any value less than or equal to the cost. Furthermore, the advertiser's budget and desired CPM indicates a number of impressions that need to be assigned to the advertiser (e.g., the quarterly budget divided by a quarterly CPM indicates a number of impressions to assign to the advertiser in that quarter, the annual budget divided by the annual CPM indicates a number of impressions to assign to the advertiser in the year, etc.). The item aggregation engine 142 can assign the remaining advertisement spots to the advertiser such that the price charged to the advertiser and the impressions associated with the assigned advertisement spots matches or closely matches the advertiser's desired quarterly and/or annual CPM. In an embodiment, the item aggregation engine 142 may assign advertisement spots such that the price charged to the advertiser is optimized given the advertiser's budget until the advertiser is assigned the appropriate number of impressions (e.g., advertisement spots are assigned to the advertiser such that the advertiser has a CPM close to or equal to the desired CPM).

Optionally, the item aggregation engine 142 may assign advertisement spots such that the advertiser is assigned a larger number of impressions such that the advertiser has a CPM that is lower than the desired CPM. In other words, the item aggregation engine 142 may initially assign advertisement spots to an advertiser in a manner that causes the item aggregation engine 142 to exceed the minimum requirements of one or more constraints (e.g., television category, etc.). For example, the item aggregation engine 142 may have trouble meeting the desired CPM given the more and less flexible constraints. In order to more closely satisfy the more and/or less flexible constraints, the item aggregation engine 142 can assign the advertiser advertisement spots in a manner that results in the advertiser having a CPM lower than the desired CPM (e.g., a larger number of impressions than desired). The item aggregation engine 142 can then unassign advertisement spots until the desired CPM is reached (e.g., until the advertiser CPM is equal to or slightly less than the desired CPM). This process of over-assigning advertisement spots to the advertiser and then unassigning select advertisement spots may result in the item aggregation engine 142 being more likely to meet the more and/or less flexible constraints. As an illustrative example, the advertisement spots that the item aggregation engine 142 unassigns may be advertisement spots that are associated with more and/or less flexible constraints that have already been satisfied or that are otherwise easier to satisfy given the inventory of available advertisement spots (e.g., if a target indicates that 20% of advertisement spots should be associated with a group and the item aggregation engine 142 has assigned the advertiser to 25% of advertisement spots associated with the group, the item aggregation engine 142 can unassign advertisement spots associated with the group until, for example, the advertiser CPM is increased to the desired CPM, the number of impressions is reduced to the desired number of impressions, etc.).

In some embodiments, the item aggregation engine 142 may not be able to generate a data item package in which one particular constraint is met. Thus, the item aggregation engine 142 can split the available advertisement spot inventory into two or more groups, and implement the processes described herein on each group. Thus, the item aggregation engine 142 may assign advertisement spots to the advertiser from spots available in the first group to form a first partial data item package and may assign advertisement spots to the advertiser from spots available in the second group to form a second partial data item package. The item aggregation engine 142 may assign advertisement spots in a manner such that the more and/or less flexible constraints (other than the desired CPM or any other constraints that correspond with an absolute value rather than a percentage) are satisfied in each partial data item package. Alternatively, the item aggregation engine 142 may assign advertisement spots in a manner such that one group of more and/or less flexible constraints are satisfied in one partial data item package, another group of more and/or less flexible constraints are satisfied in a second partial data item package, and so on. The item aggregation engine 142 can then merge the partial data item packages to form a single data item package. By reducing the number of advertisement spots that the item aggregation engine 142 evaluates in generating a partial data item package, the item aggregation engine 142 may be able to more closely meet the more and/or less flexible constraints after the partial data item packages are merged. For example, splitting the available advertisement spot inventory increases the flexibility between constraints by separating groups of constraints into independent data item packages. Thus, if the available advertisement spot inventory is not split, one constraint (e.g., television category, such as day) may receive a lower percentage than desired because another constraint (e.g., television category, such as late night) received a higher percentage than desired. If each of these two constraints are separated into different data item packages, then the percentage of advertisement spots assigned to the first data item package in response to the first constraint will not be affected by the percentage of advertisement spots assigned to the second data item package in response to the second constraint.

While the advertiser may be assigned the appropriate number of impressions, the item aggregation engine 142 may analyze the assigned advertisement spots and related data (e.g., price charged to advertiser, CPM, etc.) and rebalance the assignment of one or more advertisement spots. For example, one or more assigned advertisement spots may result in the data item package falling short of a target or range of targets or may be relatively inefficient. Such assigned advertisement spots can be unassigned (leaving other advertisement spots assigned to the advertiser) and the item aggregation engine 142 can follow the process described above to assign different advertisement spots to the advertiser in a manner that causes the data item package to come closer to meeting the target or range of targets and/or in a manner that improves value to the advertiser and/or the television network. As an example, in some cases, after the advertiser has been assigned advertisement spots, it may be that an assigned advertisement spot is relatively inefficient and is unnecessary to satisfy a set of constraints. Thus, the item aggregation engine 142 can unassign the advertisement spot initially assigned to the advertiser and another advertisement spot can be assigned to the advertiser. The item aggregation engine 142 may choose another advertisement spot to assign to the advertiser in a manner that optimizes value to the advertiser (e.g., improve the resulting CPM) and/or value to the television network (e.g., achieve a more optimal use of the advertiser's budget).

Once any advertisement spot reassignments are complete, the item aggregation engine 142 can determine or generate a data item package. The data item package can be transmitted to the user interface generator 146 and the user interface generator 146 can generate user interface data such that the data item package can be displayed in a user interface generated by the user device 160. The user interface generator 146 can transmit the user interface data to the user device 160 via the network 120 and the packaging network service 130 for display.

In some embodiments, the item aggregation engine 142 determines one or more data item packages in parallel. For example, the more flexible constraints are associated with tolerance levels. While the user may select a particular tolerance level for a more flexible constraint, the item aggregation engine 142 may determine a data item package using the tolerance levels provided by the user and one or more data item packages using tolerance levels that differ from the user-selected values. In some cases, a data item package that is determined using one or more tolerance levels that differ from user-selected values may produce more optimal value for the advertiser and/or the television network. Thus, the recommendation engine 144 can generate a notification or result in such a situation, identifying which tolerance level(s) can be adjusted to achieve the more optimal value, by how much the tolerance level(s) should be adjusted, and/or the increase in value that would be achieved if the tolerance level(s) were so adjusted. The recommendation engine 144 can transmit the notification or result to the user device 160 for display in the user interface.

FIGS. 2 through 5C below provide additional examples of less flexible constraints, more flexible constraints, tolerance levels, generated notifications, and the process by which the item aggregation engine 142 determines the data item package.

After a data item package is generated and approved by an advertiser, advertisements of the advertiser may be broadcast during the assigned advertisement spots. As described above, an advertiser may be interested in reaching a set number of viewers (e.g., a number of impressions) given a budget. However, the initial assignment of advertising spots may be based on an estimated number of viewers. In some cases, the actual number of viewers varies from the estimated number of viewers. Thus, while the advertiser may have expected to reach a set number of viewers, the actual number of viewers reached once the advertisements are broadcast may be less than, equal to, or greater than the expected number of viewers. In cases in which the actual number of viewers reached is less than the expected number of viewers reached (e.g., the actual number of impressions is less than the expected number of impressions, referred to herein as an "audience deficiency"), additional advertisement spots may be assigned to the advertiser to account for the deficiency (e.g., often at no cost to the advertiser).

Accordingly, the package updater 148 can receive data from the entity data store 150 and/or the user data store 152 via the network 120 and the packaging network service 130 to generate an audience deficiency package in which additional advertisement spots are assigned to an advertiser to account for an audience deficiency resulting from a previously generated data item package. The package updater 148 can further receive input data provided by the user device 160 via the network 120 and the packaging network service 130. The input data may include constraints that limit which advertisement spots are available to be assigned to one or more advertisers, such as an identification of television titles that include advertisement spots that can be assigned to one or more advertisers and/or an identification of television titles that include advertisement spots that cannot be assigned to one or more advertisers, advertisement spot lengths, demographics, day of week, category of television show (e.g., day, fringe, late night, movie, original series, special, weekend show, action, drama, comedy, sports, news, etc.), categories of advertisements that may conflict with the one or more advertisers, and/or the like. Thus, the constraints may correspond to targets to be met. The package updater 148 can use such data to generate an audience deficiency package that can be transmitted to the user device 160 via the network 120 and the packaging network service 130.

As an example, the package updater 148 may query the user data store 152 to identify television titles that include an available inventory of advertisement spots. A seller of advertisement spots may view the television titles via a user interface provided to the user device 160. The seller can select filters based on, for example, time period to limit the number of television titles that are displayed. The seller can also select options based on, for example, demographic and/or stream, to influence the impressions shown per television title. Using the user interface, the seller can select television titles that include advertisement spots that are available for assignment to advertisers to correct the audience deficiency.

As described above, previously generated data item packages may be stored in the entity data store 150. Once one or more advertisements corresponding to a data item package have been broadcast, data corresponding to the broadcast can be stored in the entity data store 150 in association with the data item package. For example, such data can include the expected number of impressions, the actual number of impressions (e.g., the number of impressions that resulted from the broadcast), and/or a difference between the expected number of impressions and the actual number of impressions. Thus, the package updater 148 can also retrieve one or more of the previously generated data item packages and associated data from the entity data store 150 for display in the user interface. While the item aggregation engine 142 generates a single data item package for an advertiser, the package updater 148 may evaluate multiple data item packages in generating the audience deficiency package. Accordingly, the seller can also view the data corresponding to the data item packages in the user interface and select one or more data item packages in which an audience deficiency resulted.

In addition to selecting the television titles and data item package(s), the seller may also set one or more constraints. For example, for each selected data item package, the seller may indicate what percentage of advertisement spots corresponding to a particular category of television show should be assigned to the advertiser associated with the respective data item package. As another example, for each selected data item package, the seller may indicate a desired number of impressions. As another example, for each selected data item package, the seller may indicate categories of advertisements that may conflict with the advertiser associated with the respective data item package. As another example, for each selected data item package, the seller may indicate the allowable advertisement spot length(s). As another example, for each selected data item package, the seller may indicate which television titles and corresponding advertisement spots should be excluded from being assigned to the advertiser associated with the respective data item package.

Using the selected television titles, data item packages, and constraints, the package updater 148 can generate an audience deficiency package. The audience deficiency package may include an assignment of advertisement spots to the advertisers that are associated with the selected data item packages. Thus, a single audience deficiency package may include advertisement spots assigned to different advertisers. As an illustrative example, the package updater 148 may identify, for each selected data item package, a number of impressions as a target to be reached by the audience deficiency package. The package updater 148 can generate the audience deficiency package by iterating through each advertisement spot available in each selected television title and determining which advertiser (e.g., which data item package) is the best advertiser to assign to the respective advertisement spot. For example, each advertiser may be interested in a certain demographic and each advertisement spot may be best suited for a certain demographic (e.g., the impressions in one demographic are higher than the impressions in the other demographics). The best advertiser to assign to an advertisement spot may then be the advertiser that is interested in the same demographic as the demographic to which the advertisement spot is best suited. In other words, the best advertiser to assign to an advertisement spot may be the advertiser that would receive the highest number of impressions in the demographic in which the advertiser is interested. The package updater 148 can rank advertisers from best to worst using the impressions and/or demographic information as the ranking criteria.

However, the best advertiser to assign to an advertisement spot may be affected by the selected constraints. For example, if one advertiser would receive the highest number of impressions in the demographic in which the advertiser is interested if the advertiser is assigned to a given advertisement spot, the package updater 148 may nonetheless not assign the advertiser to the advertisement spot if, for example, the advertisement spot is associated with a category of television show in which the advertiser is not interested (e.g., constraints indicate that 0% of advertisement spots in this category of television show should be assigned to the advertiser), the advertiser is excluded from being assigned to the advertisement spot because the advertisement spot is associated with an excluded television title, the advertisement spot does not have a length that falls within the allowable spot lengths, the advertisement spot is within a same advertisement segment (e.g., a sequence of advertisement spots between the content of the television title, also referred to as a commercial break) as another advertisement that conflicts with the advertiser, and/or the like. Certain constraints (e.g., television title exclusions) may be considered hard constraints that cannot be violated, whereas other constraints (e.g., categories of television shows, allowable spot lengths, etc.) may be considered flexible constraints that can be violated to a certain degree (e.g., by 5%, 15%, 25%, etc.) if necessary to complete the audience deficiency package. If the otherwise best advertiser is not assigned to an advertisement spot, then the package updater 148 may assign the next best advertiser to the advertisement spot if the selected constraints allow such an assignment. If the selected constraints do not allow the assignment, the package updater 148 can continue down the ranking of advertisers until a suitable advertiser is identified.

The package updater 148 may repeat the process described above until a sufficient number of advertisement spots have been assigned to the advertisers (e.g., the number of impressions needed to account for the audience deficiency have been fulfilled by the assigned advertisement spots) and/or until each available advertisement spots has been assigned. Ultimately, the audience deficiency package generated by the package updater 148 may include an assignment of advertisement spots to advertisers in a manner such that the audience deficiency associated with each advertiser is corrected via the advertisement spot assignments. This process may maximize the efficiency of advertisement spot assignments because by identifying the best advertiser for a given advertisement spot, the package updater 148 may assign a minimum number of advertisement spots to advertisers to correct the audience deficiency. This may leave a higher number of advertisement spots that can be assigned to other advertisers for a non-zero amount.

In some embodiments, the package updater 148 cannot generate the audience deficiency package according to the specified selections and/or constraints. Thus, the package updater 148 may generate a notification for display in a user interface indicating how the selections and/or constraints can be modified in a way that allows the audience deficiency package to be generated. For example, the package updater 148 may determine, while iterating through the advertisement spots, that one or more advertisement spots cannot be assigned to any advertiser given the constraints and that all other advertisement spots have been assigned without all impression targets being met. The package updater 148 may identify the constraint of an advertiser that does not have its impression target met that is preventing the unassigned advertisement spot(s) from being assigned to the advertiser and what modification to the constraint would allow the unassigned advertisement spot(s) to be assigned to the advertiser. The package updater 148 can use this identification to then generate a notification stating that the audience deficiency package can be generated if the identified constraint is modified in a manner as identified by the package updater 148 that would allow the unassigned advertisement spot(s) to be assigned to the advertiser.

In addition, once an audience deficiency package is generated, the seller can lock the generated audience deficiency package. Locking the generated audience deficiency package causes the package updater 148 to assume that the advertisement spots assigned in the audience deficiency package are no longer available. Thus, if the seller instructs the package updater 148 to generate audience deficiency package(s) for other data item packages, then the advertisement spots assigned in the audience deficiency package would not be available to be assigned in the future audience deficiency package(s).

The package updater 148 can transmit the audience deficiency package to the user interface generator 146 and the user interface generator 146 can generate user interface data such that the audience deficiency package can be displayed in a user interface generated by the user device 160. The user interface generator 146 can transmit the user interface data to the user device 160 via the network 120 and the packaging network service 130 for display.

FIGS. 7 through 9C below provide example user interfaces depicting the process by which the package updater 148 generates the audience deficiency package.

The user device 160 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 160 may execute a browser application to communicate with the item packaging system 140.

The data item packaging system 100 may be used by buyers and/or sellers. For example, the user device 160 may be operated by a buyer interested in purchasing advertisement spots to use for advertising a product. The buyer may instruct the item packaging system 140 to determine a data item package that can be presented to a seller for review. As another example, the user device 160 may be operated by a seller that owns advertisement spots in commercial breaks for various television shows. The seller may instruct the item packaging system 140 to determine a data item package that can be offered to a buyer.

In an embodiment, the network 120 includes any communications network, such as the Internet. The network 120 may be a wired network, a wireless network, or a combination of the two. For example, network 120 may be a local area network (LAN) and/or a wireless area network (WAN).

Additional details regarding the systems and/or services by which the functionality of the present disclosure is implemented are provided below.

Example Data Item Package User Interfaces

Figure 2:
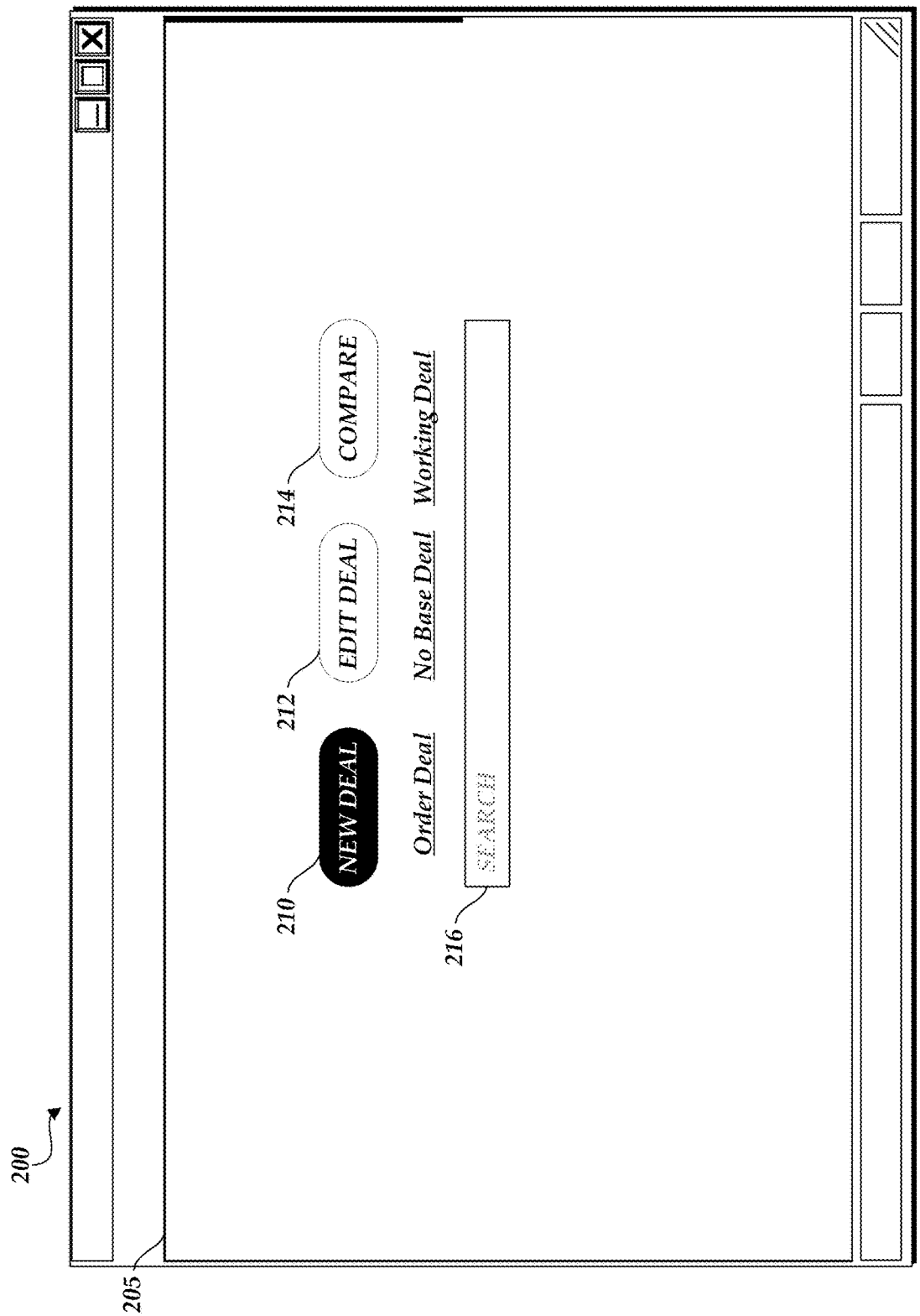
FIG. 2 illustrates a user interface displaying a package creation page that allows a user to begin a data item package creation process.

FIG. 2 illustrates a user interface 200 displaying a package creation page that allows a user to begin a data item package creation process. The user interface 200 can be displayed by the user device 160 and user interface data that causes the user device 160 to display the user interface 200 can be generated by the user interface generator 146. As illustrated in FIG. 2, the user interface 200 includes a window 205 that includes a new deal button 210, an edit deal button 212, a compare deal button 214, and a search field 216.

A user can select the new deal button 210 in order to cause the item packaging system 140 to generate a new data item package. The user can select the edit deal button 212 in order to cause the user device 160 to retrieve an existing data item package so that the user can modify one or more aspects of the data item package. For example, one or more data item packages can be stored locally in memory of the user device 160 and/or in the entity date store 150. The user can select the compare button 214 to compare a data item package with a package implemented by the television network (e.g., a data item package approved by the advertiser, with or without modifications). The user can provide a name for a new data item package or search for an existing data item package using the search field 216.

In some embodiments, an advertiser may have purchased a data item package from the television network in the past. In such a situation, information associated with the historical data item package can populate a user interface as the user attempts to generate a new data item package. Such information can be retrieved from the entity data store 150. Alternatively, no historical data item package may exist. In such a situation, the user can select a pre-computed mix (e.g., pre-computed by the item packaging system 140) that represents the breakdown of the actual inventory (e.g., if there is 20% animation in the inventory, then the pre-calculated mix targets 20% in animation).

Figure 3A:
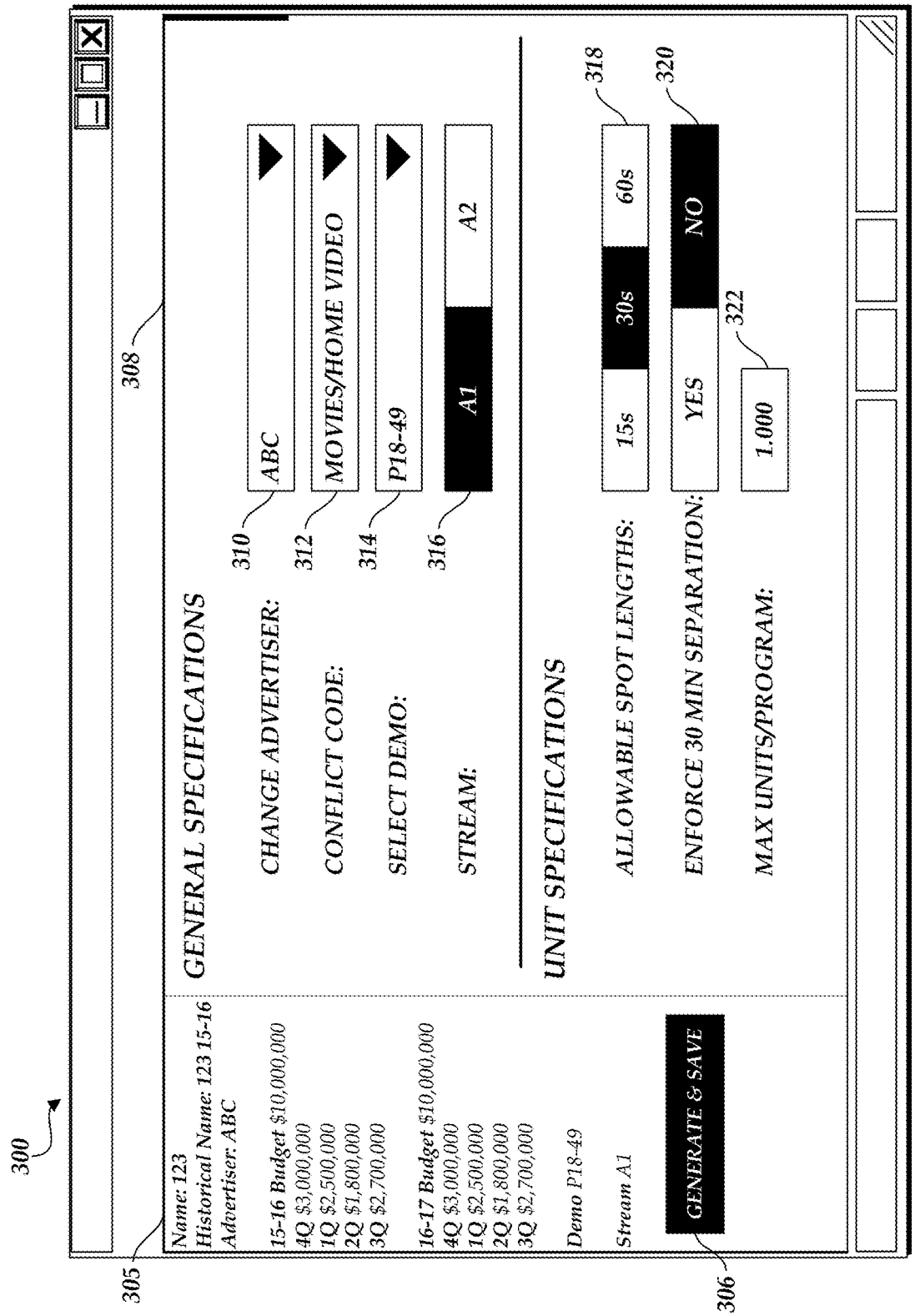

FIGS. 3A-3E illustrate a user interface 300 displaying a specifications page that allows a user to set constraints for a data item package. The user interface 300 can be displayed by the user device 160 and user interface data that causes the user device 160 to display the user interface 300 can be generated by the user interface generator 146. As illustrated in FIG. 3A, the user interface 300 includes a window 305 and a window 308.

The window 305 depicts recommended information that can be derived from a historical data item package. For example, the window 305 identifies a name of the data item package, a name of the historical data item package, a name of the advertiser, an annual and quarterly budget of the advertiser for a past television year (e.g., 2015-2016), an annual and quarterly budget of the advertiser for the current television year (e.g., 2016-2017), a target demographic of the current data item package (e.g., P18-49), and a stream of the current data item package (e.g., A1, which may indicate that impressions are counted for any views of an advertisement or television title that includes the advertisement within 24 hours or 1 day of the initial airing). The window 305 may further include a generate and save button 306 that can be selected when the constraints of the data item package are set.

The window 308 includes an option to select general specifications and unit specifications. For example, under general specifications, the user can select dropdown menu 310 to identify the advertiser, the user can select dropdown menu 312 to identify the conflict code of the advertiser (e.g., movies/home video, car manufacturer, pharmaceutical company, food/beverage provider, etc.), the user can select dropdown menu 314 to identify the target demographic (e.g., P2+, P18-49, A18-34, etc.), and the user can select toggle button 316 to select the desired stream. The conflict code may be used by the item aggregation engine 142 to avoid placing advertisements from advertisers with the same conflict code in the same commercial break. The target demographic selection may determine what impressions are counted towards each advertisement spot (e.g., the same advertisement spot may have a different number of impressions in one demographic than in another demographic) and/or the price of an advertisement spot.

Under unit specifications, the user can select toggle button 318 to select the allowable spot lengths (e.g., 15 seconds, 30 seconds, 60 seconds), the user can select toggle button 320 to identify whether a 30 minute separation should be enforced, and the user can select toggle button 322 to identify the maximum number of advertisement spots to be assigned to an advertiser within a single television title airing or program (e.g., the maximum number of advertisement spots can increase in quarter units, such as 0.25, 0.5, 1, 1.25, 1.5, 1.75, 2, etc.). Thus, the unit specifications may define the size of advertisement spots that can be assigned to the advertiser and the spacing between advertisement spots.

As illustrated in FIG. 3B, the window 308 further includes an option to select a rate of change. For example, the user can provide a rate of change percentage value in box 324. The rate of change percentage value may indicate how much a CPM increases or decreases from the previous year. This value may be negotiated by the advertiser and the television network or may be an industry standard value. For example, the window 308 further includes a table 328 that identifies default quarterly CPMs (e.g., quarterly CPMs of the historical data item package (or the previous year)), an input CPM for each quarter (which may match the CPMs of the historical data item package), the rate of change specified in the box 324, and the new target CPM for the current year for each quarter (e.g., the new target CPM is calculated by taking the input CPM for the quarter and increasing it by the rate of change percentage value). An annual target CPM may also be calculated using a CPM from the historical data item package and the rate of change percentage value.

The window 308 may also include a toggle button 326 that allows the user to override a baseline index. If the toggle button 326 is set to "no," the item aggregation engine 142 generates a baseline index using an index of the historical data item package, the CPM rate of change, and/or inventory value rate of change (e.g., the rate of change of a price of advertisement spots year to year). For example, the current baseline index can be calculated by taking the baseline index of the historical data item package and applying the CPM rate of change and/or inventory value rate of change. Otherwise, if the toggle button 326 is set to "yes," the user can set a baseline index. The baseline index is described in greater detail below.

Figure 3C:
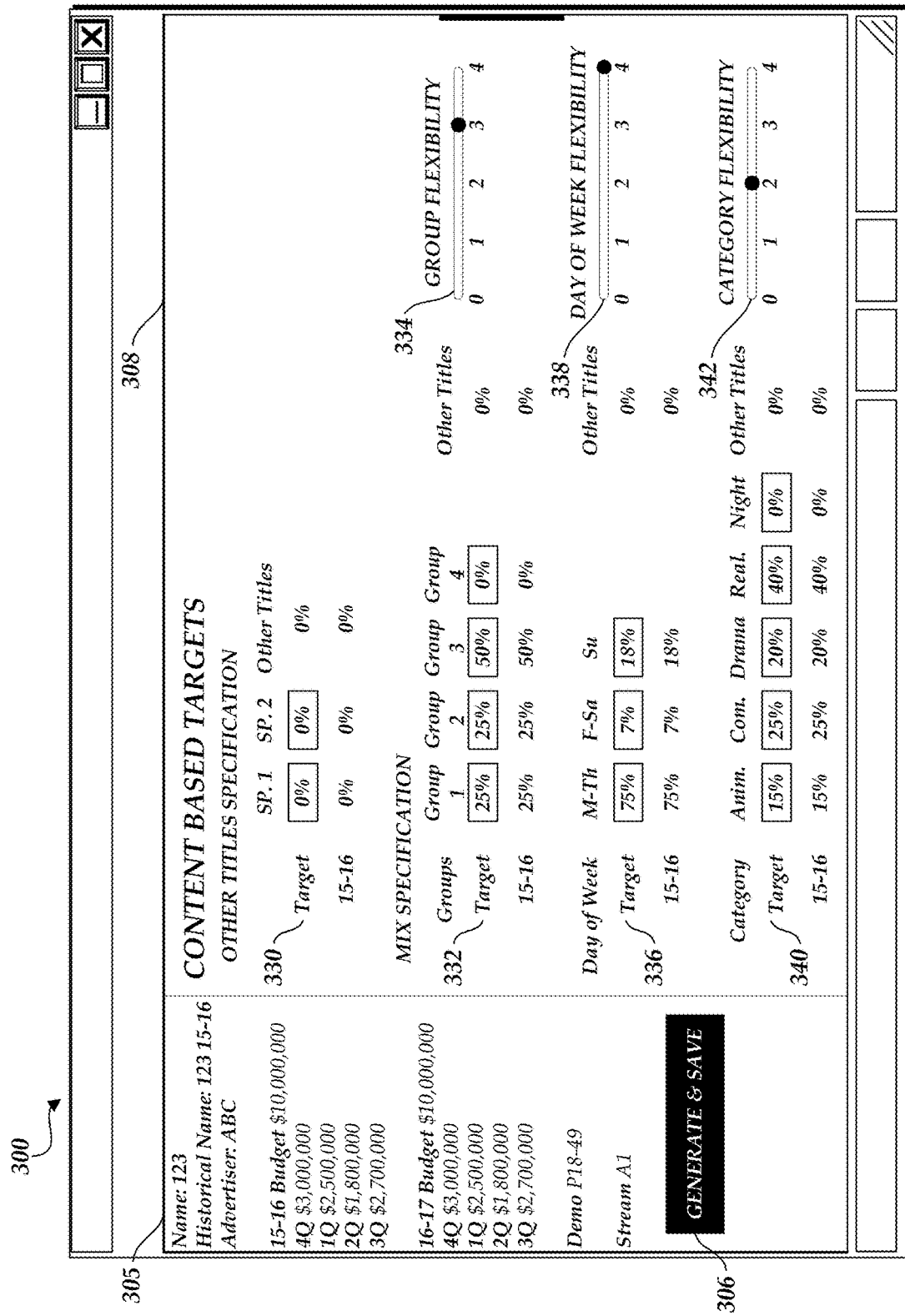

As illustrated in FIG. 3C, the window 308 further includes an option to select other titles specifications and mix specifications. Other title specifications can include the selection of a percentage of advertisement spots that should be assigned to non-traditional television titles that are not associated with a category, a specific day of the week, and/or a group (e.g., special events). For example, the window 308 can display a percentage of advertisement spots assigned to specials 1, specials 2, and other titles in the historical data item package. As a default, the same percentages may be applied to the current data item package. However, the user may adjust such percentages via boxes in target row 330. If the percentages are zero, then the item aggregation engine 142 does not assign any advertisement spots to such television titles. Otherwise, the item aggregation engine 142 can treat the percentages as less flexible or more flexible constraints.

The mix specifications can include the selection of a percentage of advertisement spots that should be assigned to television titles categorized under group 1, group 2, group 3, group 4, and/or other titles in the current data item package. The mix specifications can include a percentage of advertisement spots assigned to the various groups in the historical data item package. As a default, the same percentages may be applied to the current data item package. However, the user may adjust such percentages via boxes in target row 332. If the percentages are zero, then the item aggregation engine 142 does not assign any advertisement spots to television titles in the respective group (and can be considered less flexible constraints). Otherwise, the item aggregation engine 142 can treat the percentages as more flexible constraints. The flexibility of the percentages can be dependent on the value of slider 334. For example, if the value of slider 334 is 4, then the item aggregate engine 142 may disregard the percentages in the target row 332 such that the data item package can include any percentage of advertisement spots associated with a particular group. Thus, the target for each group can be between 0% and 100%. On the other hand, if the value of the slider 334 is 0, then the item aggregate engine 142 may strictly adhere to the percentages specified in the row 332. Thus, the target for each group can be very close to the specified percentage (e.g., within a threshold value of the specified percentage). Values between 0 and 4 may be increasingly more flexible such that the targets have a range that increasingly varies from the specified percentage.

The mix specifications can also include the selection of a percentage of advertisement spots that should be assigned to television titles airing on a given day of the week (e.g., Monday through Thursday, Friday through Saturday, and Sunday) in the current data item package. The mix specifications can include a percentage of advertisement spots assigned to the various days of the week in the historical data item package. As a default, the same percentages may be applied to the current data item package. However, the user may adjust such percentages via boxes in target row 336. If the percentages are zero, then the item aggregation engine 142 does not assign any advertisement spots to television titles airing on the particular day of the week (and can be considered less flexible constraints). Otherwise, the item aggregation engine 142 can treat the percentages as more flexible constraints. The flexibility of the percentages can be dependent on the value of slider 338. For example, if the value of slider 338 is 4, then the item aggregate engine 142 may disregard the percentages in the target row 336 such that the data item package can include any percentage of advertisement spots airing on a particular day of the week. Thus, the target for each day of the week can be between 0% and 100%. On the other hand, if the value of the slider 338 is 0, then the item aggregate engine 142 may strictly adhere to the percentages specified in the row 336. Thus, the target for each day of the week can be close to the specified percentage (e.g., within a threshold value of the specified percentage). Values between 0 and 4 may be increasingly more flexible such that the targets have a range that increasingly varies from the specified percentage.

The mix specifications can also include the selection of a percentage of advertisement spots that should be assigned to television titles associated with a specific category (e.g., animation, comedy, drama, reality, night, etc.) in the current data item package. The mix specifications can include a percentage of advertisement spots assigned to the various categories in the historical data item package. As a default, the same percentages may be applied to the current data item package. However, the user may adjust such percentages via boxes in target row 340. If the percentages are zero, then the item aggregation engine 142 does not assign any advertisement spots to television titles associated with the particular category (and can be considered less flexible constraints). Otherwise, the item aggregation engine 142 can treat the percentages as more flexible constraints. The flexibility of the percentages can be dependent on the value of slider 342. For example, if the value of slider 342 is 4, then the item aggregate engine 142 may disregard the percentages in the target row 340 such that the data item package can include any percentage of advertisement spots associated with a particular category. Thus, the target for each category can be between 0% and 100%. On the other hand, if the value of the slider 342 is 0, then the item aggregate engine 142 may strictly adhere to the percentages specified in the row 340. Thus, the target for each category can be close to the specified percentage (e.g., within a threshold value of the specified percentage). Values between 0 and 4 may be increasingly more flexible such that the targets have a range that increasingly varies from the specified percentage.

As illustrated in FIG. 3D, the window 308 further includes an option to select a flight week specification. The user can select toggle button 344 to identify whether weekly units are to be specified. For example, the advertiser can specify that at least some advertisement spots assigned in the data item package should be aired in a given week. If the toggle button 344 is set to "yes," then the item aggregation engine 142 considers percentages provided in table 348 in determining the data item package. For example, the table 348 includes a check box associated with each week in a quarter (where the quarter is selected using toggle button 346). If the check box for a week is unchecked, then the item aggregation engine 142 does not assign any advertisement spots to television titles airing in the week (and can be considered less flexible constraints). Alternatively, the item aggregation engine 142 considers a toggle setting to "no" to indicate that the advertiser has no preference regarding the week and this can be considered a more flexible constraint (e.g., where any percentage of assigned advertisement spots in the week would be acceptable). If the check box for a week is checked, then the item aggregation engine 142 can treat the percentages in target row 350 as more flexible constraints. The flexibility of the percentages can be dependent on the value of slider 352. For example, if the value of slider 352 is 4, then the item aggregate engine 142 may disregard the percentages in the target row 350 such that the data item package can include any percentage of advertisement spots associated with a particular week. Thus, the target for each week can be between 0% and 100%. On the other hand, if the value of the slider 352 is 0, then the item aggregate engine 142 may strictly adhere to the percentages specified in the row 350. Thus, the target for each week can be close to the specified percentage (e.g., within a threshold value of the specified percentage). Values between 0 and 4 may be increasingly more flexible such that the targets have a range that increasingly varies from the specified percentage.

Figure 3E:
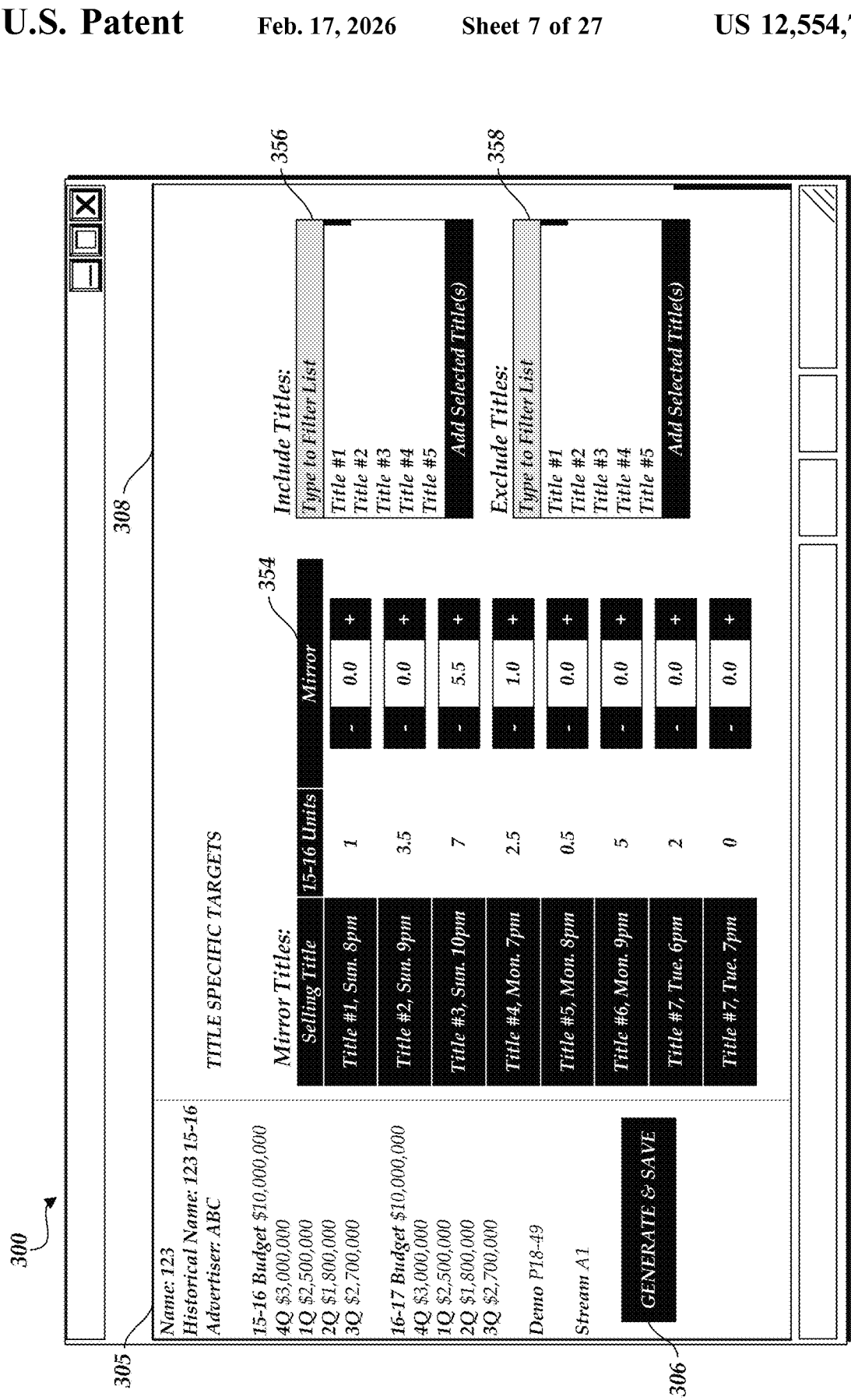

As illustrated in FIG. 3E, the window 308 further includes an option to select title specific targets. For example, in table 354, the user can select specific television titles to which advertisements should be assigned and the minimum number of units (e.g., a number of advertisement spots) associated with a particular television title that should be assigned to the advertiser in the current data item package. As a guide, the number of units associated with a particular television title that were assigned to the advertiser in the historical data item package is displayed. If the selected number of units is greater than 0, then the selected number of units may be treated by the item aggregation engine 142 as a less flexible constraint.

In addition, window 356 in the window 308 includes a list of television titles that have available advertisement spots and that can be selected to be assigned to the advertiser. For example, the table 354 may be populated with television titles to which advertisement were assigned in the historical data item package. The user may browse the window 356 for one or more television titles if the advertiser desires to be assigned advertisement spots associated with television titles not previously included in the historical data item package. Window 358 in the window 308 includes a list of television titles that, when selected, can be excluded from the current data item package. If a television title is selected for exclusion, such a selection can be treated by the item aggregation engine 142 as a less flexible constraint.

In additional embodiments, not shown, the user can provide additional inputs. For example, the user can provide an exact price for a television title and/or advertisement spot, a discount amount for a television title and/or advertisement spot, and/or a specific time (e.g., time of day, day of week, week of year, etc.) for a television title and/or advertisement spot.

Once the user provides input as described above with respect to FIGS. 3A-3E, the generate and save button 306 can be selected. Selection of the generate and save button 306 causes the user device 160 to transmit, to the item aggregation engine 142 via the network 120 and the packaging network service 130, the user-provided input. The item aggregation engine 142 can then determine or generate a current data item package based at least in part on the data received from the user device 160. The user interface generator 146 can generate user interface data to display the current data item package and corresponding data and the user interface data can be transmitted to the user device 160 for display.

Figure 4A:
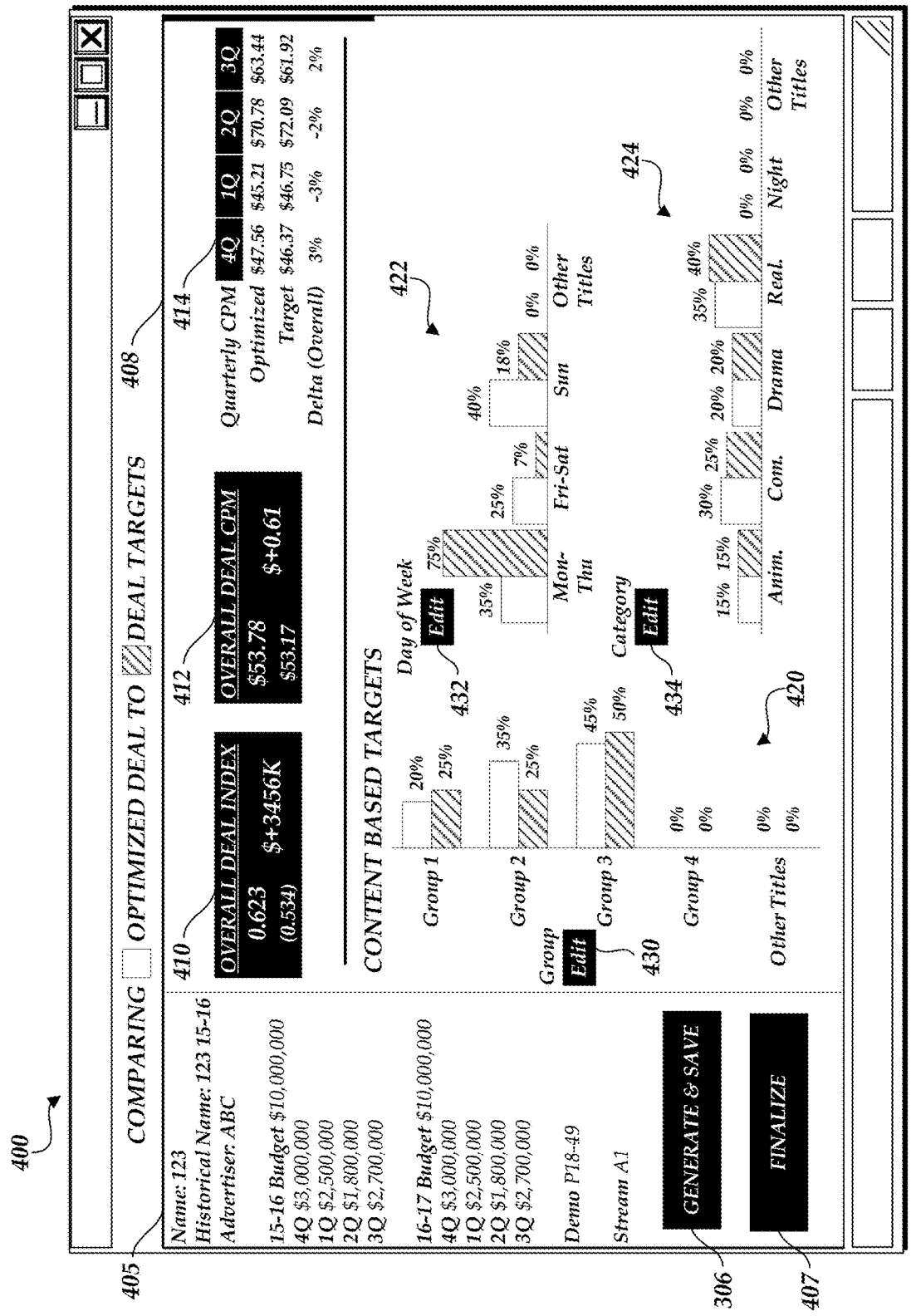
FIGS. 4A-4J illustrate a user interface displaying an optimized deal and target deal comparison page.

FIGS. 4A-4J illustrate a user interface 400 displaying an optimized deal and target deal comparison page. The user interface 400 can be displayed by the user device 160 and user interface data that causes the user device 160 to display the user interface 400 can be generated by the user interface generator 146. As illustrated in FIG. 4A, the user interface 400 includes a window 405 and a window 408. The window 405 is similar to the window 305 of FIGS. 3A-3E. However, the window 405 further includes a finalize button 407.

The window 408 includes summary information and a comparison of content based targets. For example, the summary information can include a set of numbers, referred to herein as an overall deal index 410, that represents a value to the television network of the determined data item package, another set of numbers, referred to herein as an overall deal CPM 412, that represents a value to the advertiser of the determined data item package, and a CPM summary table 414. The overall deal index 410 can include a value of the determined data item package to the television network (e.g., 0.623), a baseline value (e.g., the value of the historical data item package with the rate of change applied thereto, 0.534 in this example), and a dollar amount that may represent a difference between a dollar amount associated with the value of the determined data item package and a dollar amount associated with the baseline value (e.g., $3456K). The overall deal CPM 412 can include a CPM of the determined data item package (e.g., $53.78), an expected or baseline CPM (e.g., the CPM of the historical data item package with the rate of change applied thereto, $53.17 in this example), and a dollar amount representing the difference between the CPM and the baseline CPM (e.g., $0.61). The CPM summary table 414 can indicate quarterly CPMs of the determined data item package, quarterly CPMs specified by the user before the data item package is determined, and the difference between the two.

The comparison of content based targets includes group graphs 420, day of week graphs 422, and category graphs 424 that depict differences between the percentage of advertisement spots assigned to television titles in a group, airing on a day of the week, and associated with a category and the percentages specified by the user before the data item package is determined. In some cases, the user may be dissatisfied with the percentages of the determined data item package. Thus, the user may select group edit button 430, day of week edit button 432, or category edit button 434 to adjust the corresponding percentage and/or tolerance level.

Figure 4B:
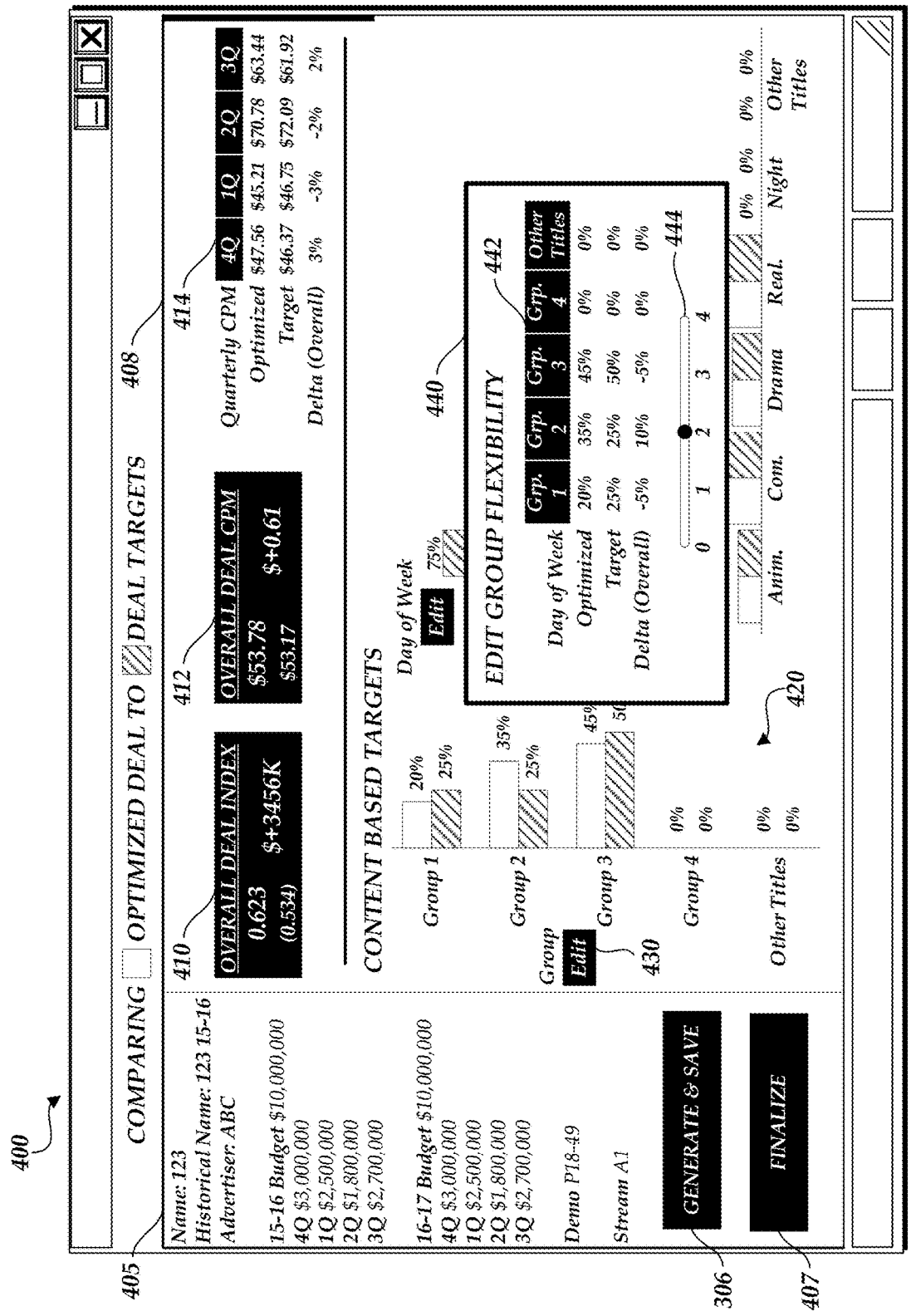

As illustrated in FIG. 4B, the group edit button 430 is selected, causing a window 440 to appear overlaying the window 408. The window 440 includes a table 442 depicting the same information illustrated in the group graphs 420. The percentages in the target row, however, can be adjusted. Furthermore, the tolerance of the group constraint can be adjusted by adjusting the value of slider 444. Once the percentages and/or tolerances are adjusted, the item aggregation engine 142 can determine a new data item package using at least the previously provided input and the modified percentages and/or tolerances.

Figure 4C:
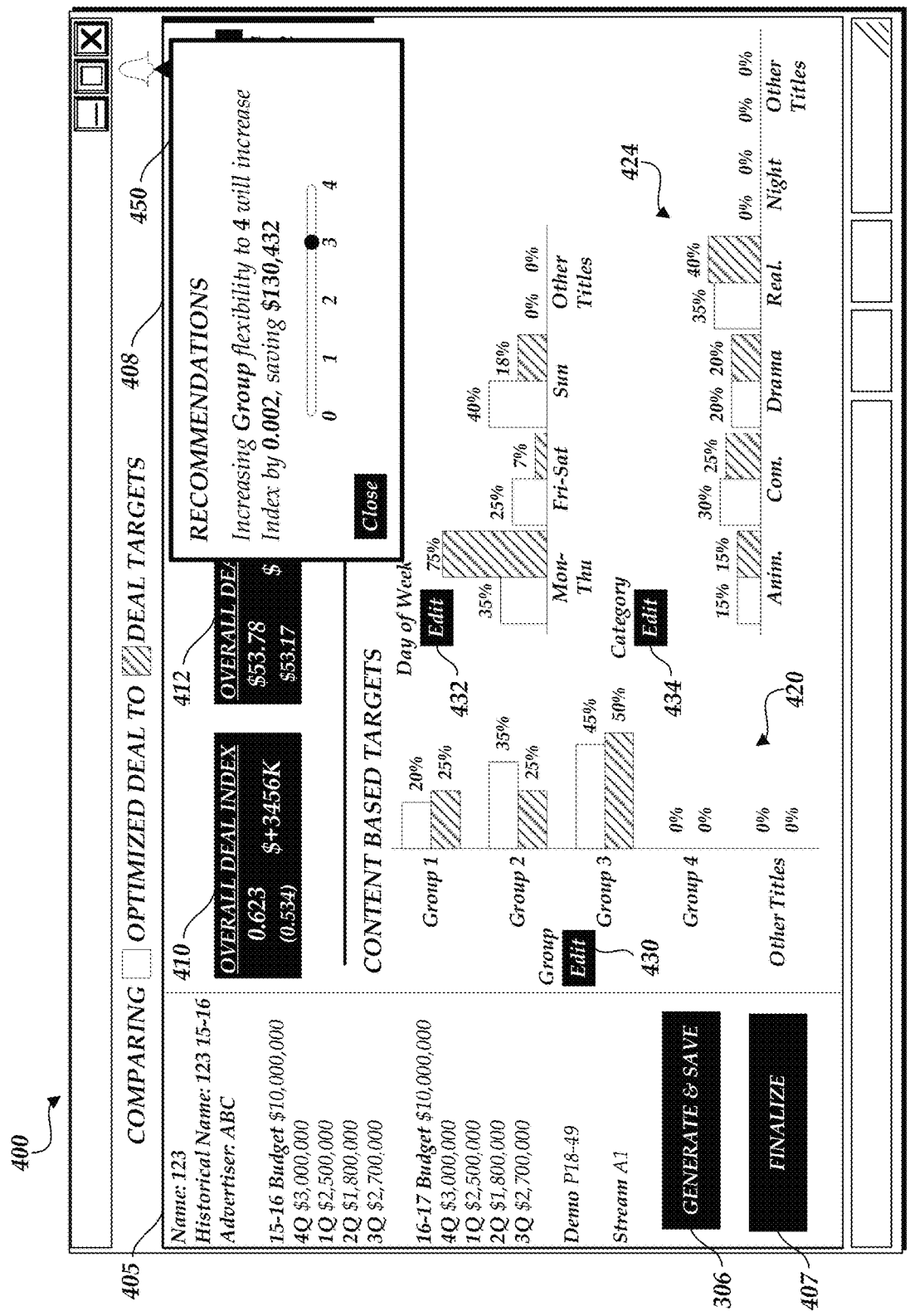

As illustrated in FIG. 4C, the user interface 400 includes a recommendation window 450. As described above, the item aggregation engine 142 can run parallel operations to generate multiple data item packages. For example, while the user may set the slider 334 to a value of 3, the slider 338 to a value of 4, and the slider 342 to a value of 2, the item aggregation engine 142 can generate one or more alternate data item packages in which the slider 334 value is 0, 1, 2, or 4, the slider 338 value is 0, 1, 2, or 3, and/or the slider 342 value is 0, 1, 3, or 4. The item aggregation engine 142 can vary one slider value at a time or multiple slider values at a time. The slider values can deviate from the specified slider value by 1 or by any number. If any of the alternate data item packages result in a value that is greater than the value of the data item package determined using the user-provided slider values, then the recommendation engine 144 can generate a notification identifying the slider value(s) that may result in more optimal value. As an example, the window 450 is a graphical representation of the notification, identifying that increasing the group flexibility to 4 (e.g., adjusting the slider 334 value to 4) may increase the value of the data item package and by how much.

Figure 4D:
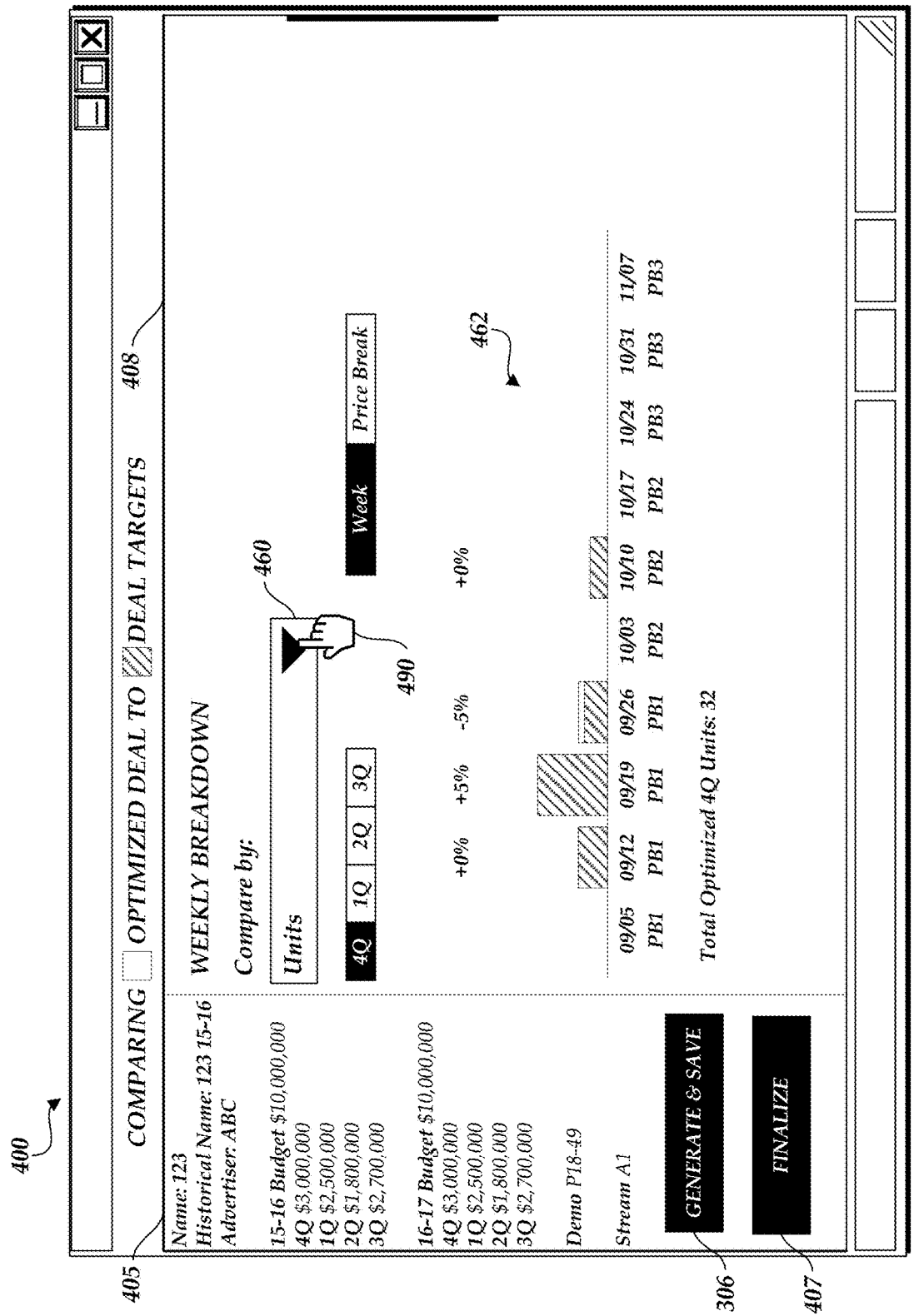

As illustrated in FIG. 4D, the window 408 further includes a weekly breakdown of assigned advertisement spots in the determined data item package as compared with the percentages specified by the user before the data item package is determined (e.g., as depicted in FIG. 3D). The assigned advertisement spots per week and the user-specified advertisement spots per week can be compared by units (e.g., the actual number of advertisement spots in a week). Graph 462 can visualize the difference between the number of assigned advertisement spots per week and the user-specified number of advertisement spots per week and/or indicate numerically the difference.

Figure 4E:
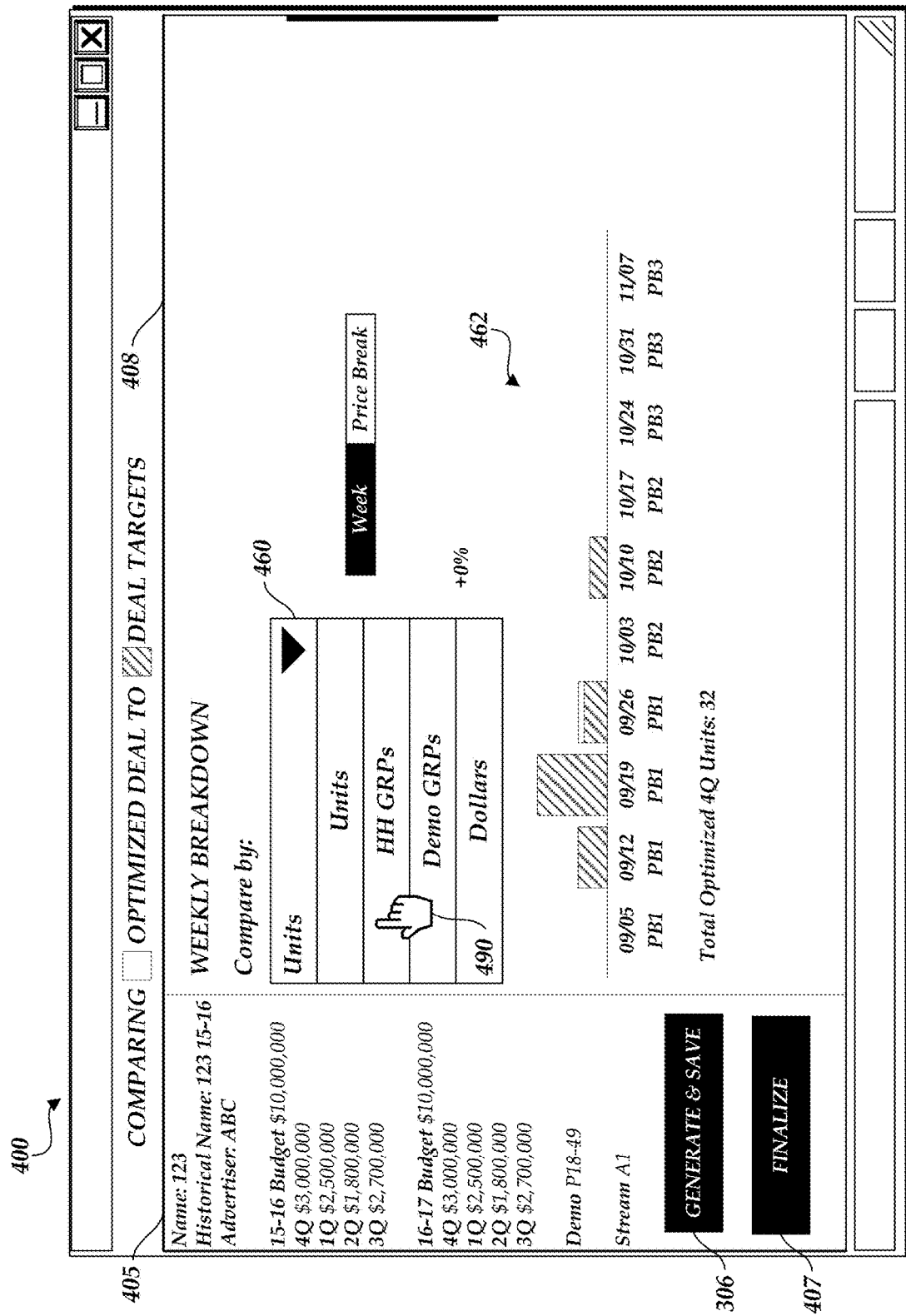
Figure 4F:
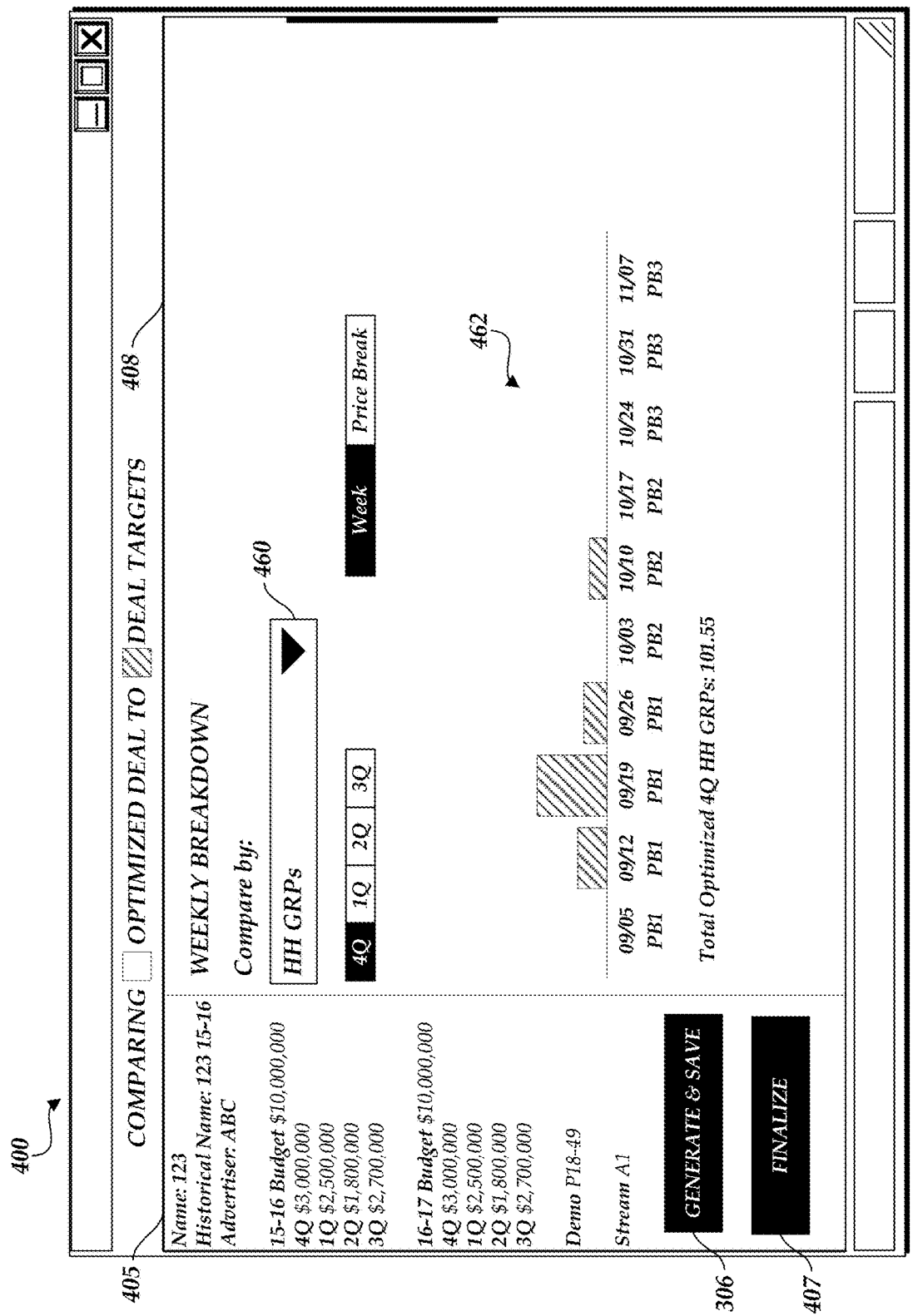
Figure 4G:
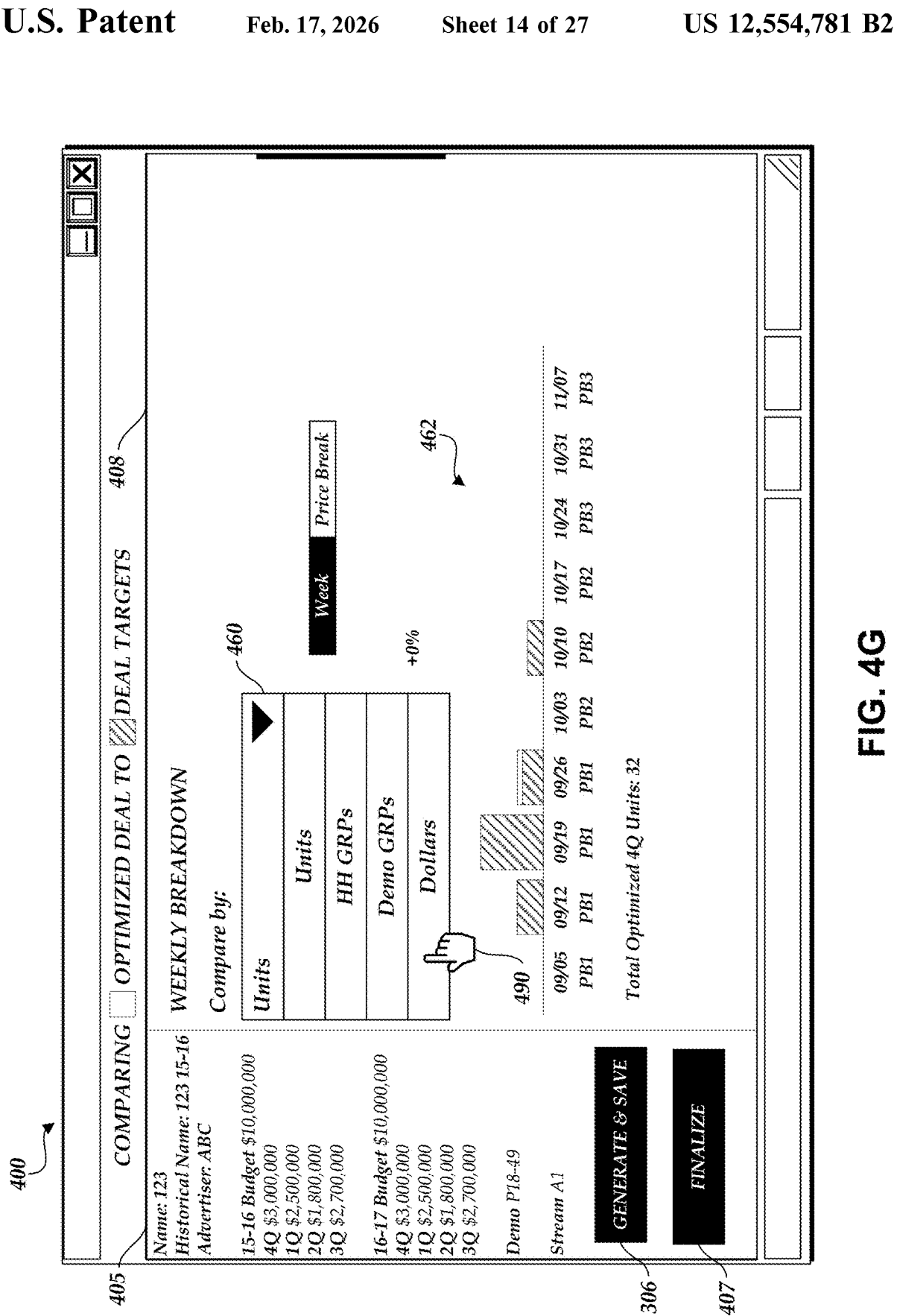
Figure 4H:
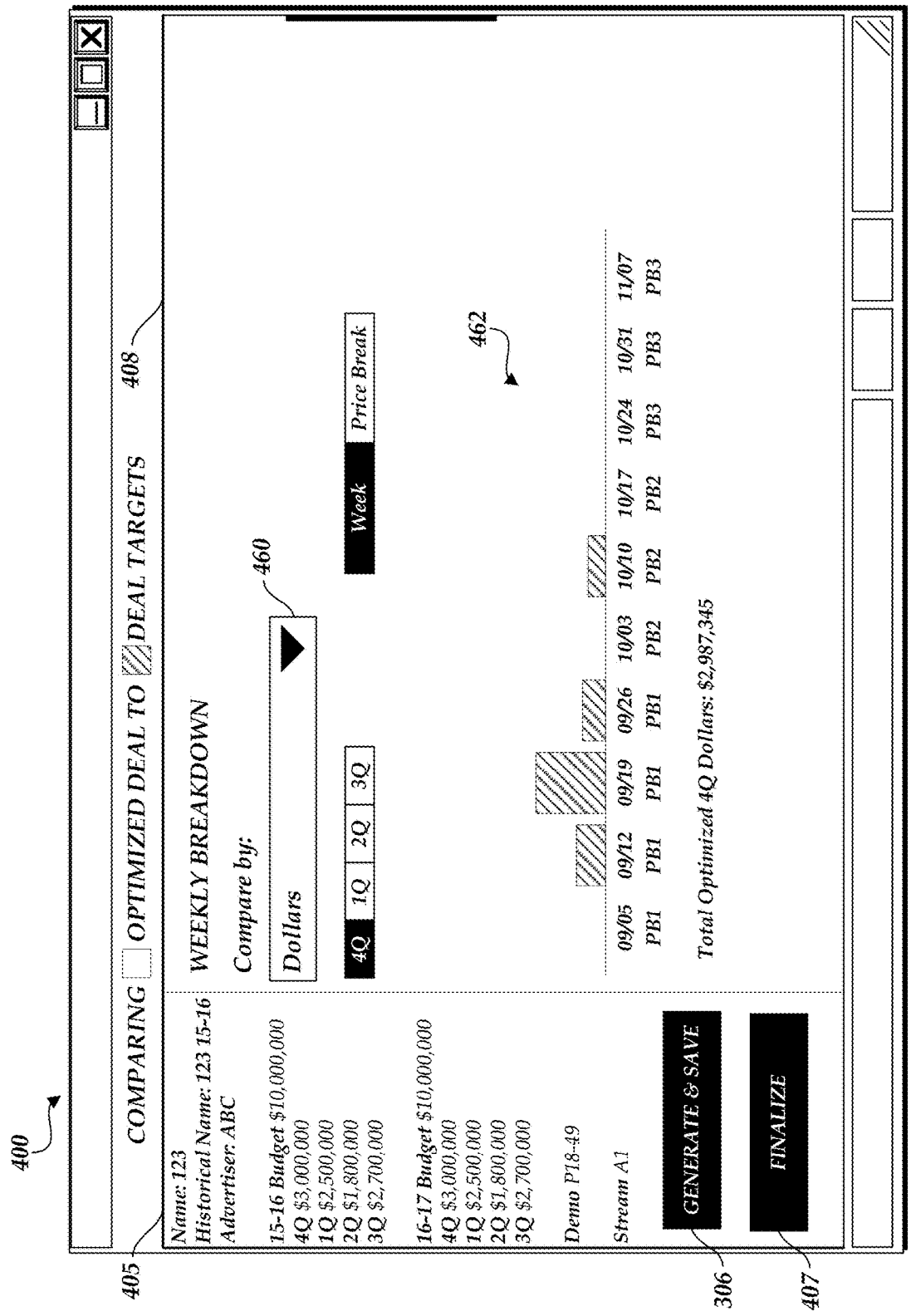

Furthermore, the user can compare the assigned advertisement spots per week and the user-specified advertisement spots per week using other metrics by selecting dropdown box 460 using, for example, cursor 490. As illustrated in FIG. 4E, the dropdown menu 460 provides several ways of comparing the data, including units, household gross rating points (HH GRPs) (e.g., a measure of the size of an advertising campaign by a medium or schedule), demographic GRPs, and dollars. If the user selects HH GRPs using the cursor 490, the graph 462 is updated to compare the assigned advertisement spots per week and the user-specified advertisement spots per week based on HH GRPs, as illustrated in FIG. 4F. Similarly, if the user selects dollars using the cursor 490 as illustrated in FIG. 4G, the graph 462 is updated to compare the assigned advertisement spots per week and the user-specified advertisement spots per week based on dollars (e.g., the amount spent each week by the advertiser), as illustrated in FIG. 4H.

Figure 4I:
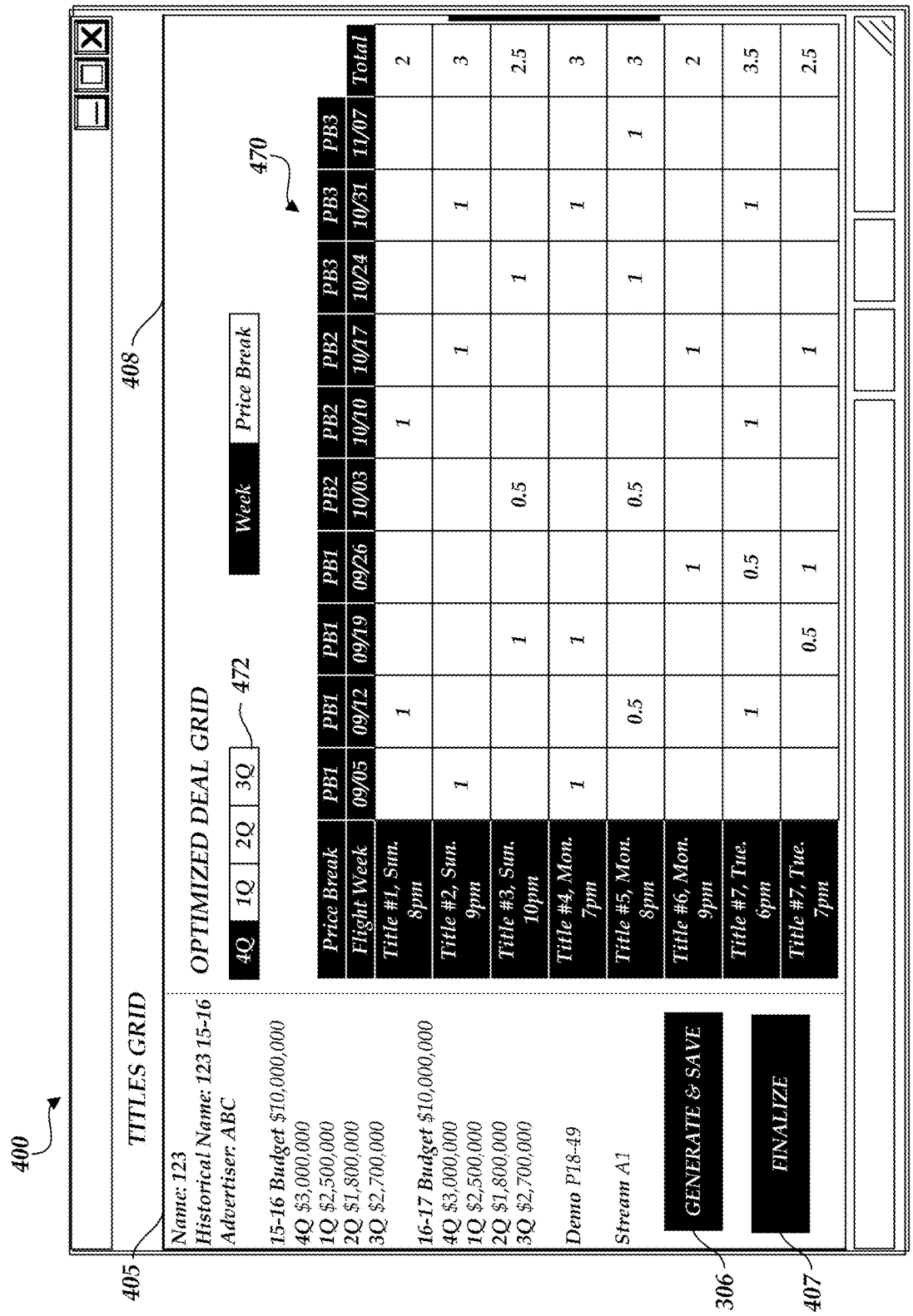

As illustrated in FIG. 4I, the window 408 further includes a deal grid 470 depicting a number of advertisement spots associated with a television title that are assigned to the advertiser and in which week the advertisement spots are assigned. The user can select different quarters using toggle button 472, which automatically causes the deal grid 470 to update to reflect the selected quarter.

Figure 4J:
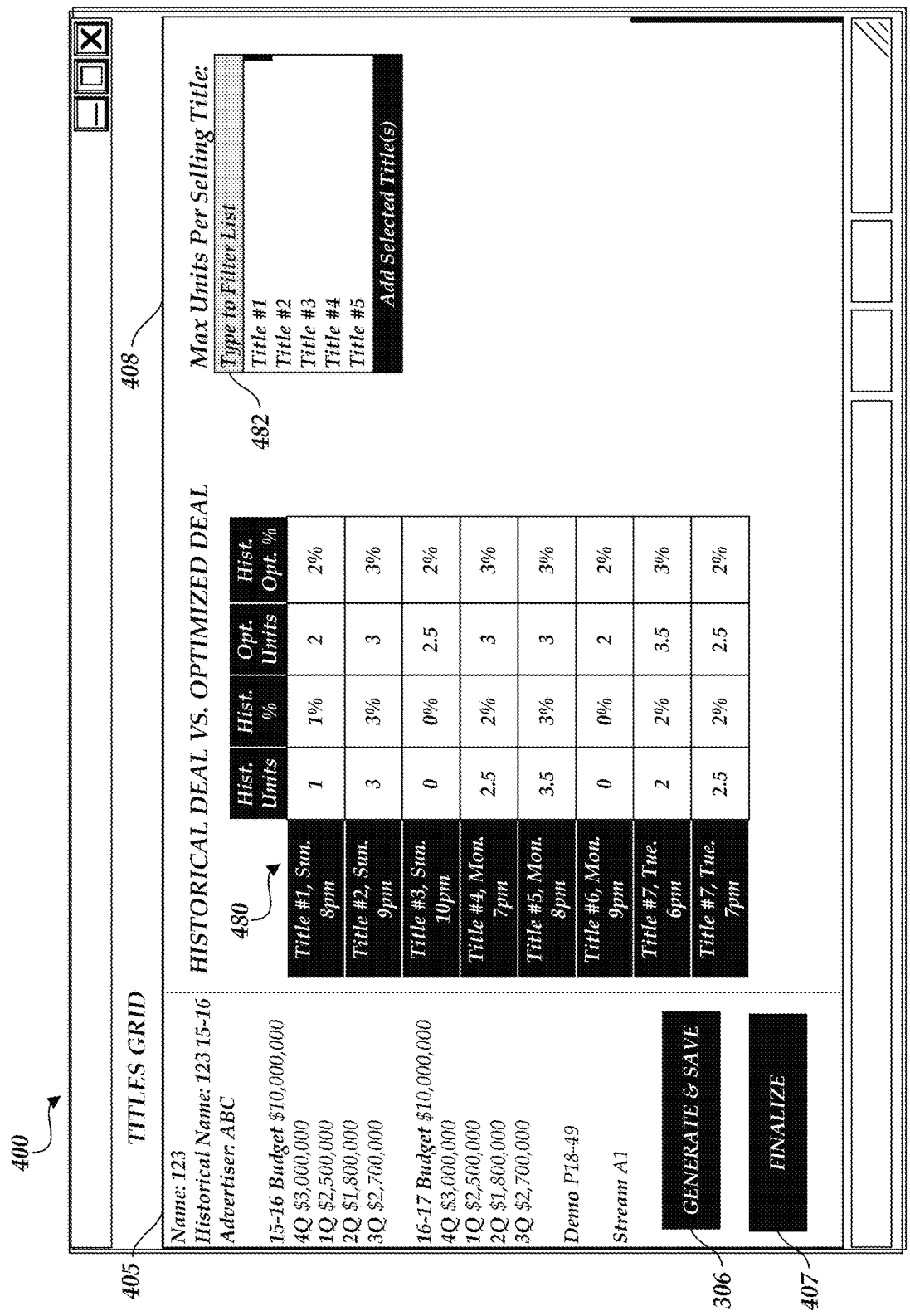

As illustrated in FIG. 4J, the window 408 further includes a comparison matrix 480 and a maximum units constraint option. The comparison matrix 480 may depict a number of advertisement spots associated with a particular television title that were assigned to the advertiser in the historical data item package, the percentage of such advertisement spots associated with the particular television title as a total of all assigned advertisement spots in the historical data item package, a number of advertisement spots associated with a particular title that are assigned to the advertiser in the determined data item package, and the percentage of such advertisement spots associated with the particular television title as a total of all assigned advertisement spots in the determined data item package.

The maximum units constraint option may be provided to the user to limit the number of advertisement spots assigned to the advertiser that are associated with any given television title. For example, based on a review of the number of advertisement spots assigned to the advertiser associated with a particular television title, the advertiser may wish to limit the number to a smaller amount. Using filter field 482, the user can identify a television title and a maximum number of advertisement spots that can be assigned to the advertiser that are associated with the identified television title. The item aggregation engine 142 can treat the specified maximum number as a more flexible constraint (e.g., where the target for the number of advertisement spots associated with the television title can be between 0 and the user-provided maximum number) and determine a new data item package using this constraint when the generate and save button 306 is selected. In an embodiment, not shown, the user can identify certain advertisement spots that should remain in the data item package before the item aggregation engine 142 determines a new data item package in response to selection of the generate and save button 306. The item aggregation engine 142 can automatically include the identified advertisement spots in the new data item package and then determine which other advertisement spots should be included in the new data item package using the techniques described above. In a further embodiment, not shown, the user can identify a specific number of advertisement spots for a specific television title in a specific time (e.g., day of year, week of year, month of year, etc.) that should remain in the data item package before the item aggregation engine 142 determines a new data item package in response to selection of the generate and save button 306. The item aggregation engine 142 can automatically include the identified number of advertisement spots in the new data item package and then determine which other advertisement spots should be included in the new data item package using the techniques described above.

If the user is satisfied with the determined data item package, the user can finalize the package by selecting the finalize button 407. The data item package can then be exported to any known document format (e.g., .doc, .xls, .pdf, etc.).

Figure 5A:
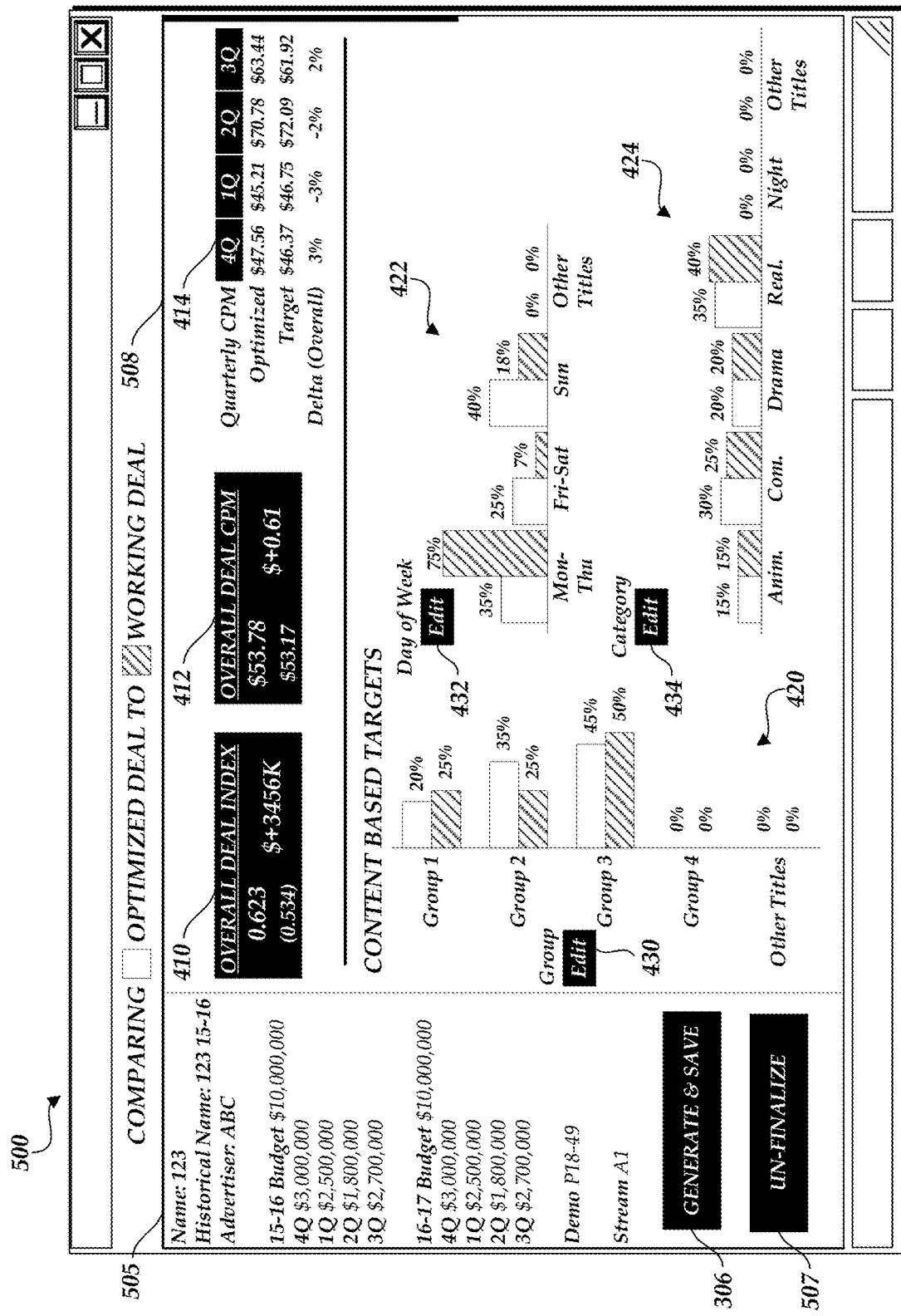

FIGS. 5A-5C illustrate a user interface 500 displaying an optimized deal and a working deal comparison page. The user interface 500 can be displayed by the user device 160 and user interface data that causes the user device 160 to display the user interface 500 can be generated by the user interface generator 146. The user interface 500 is similar to the user interface 400 of FIGS. 4A-4J. However, as illustrated in FIGS. 5A-5C, window 505 of the user interface 500 includes an un-finalize button 507 and the window 508 includes a comparison of the contents of the determined data item package with the contents of a package entered by the television network into a computing system operated by the television network. In some embodiments, the television network makes modifications to the determined data item package without instructing the item aggregation engine 142 to regenerate a new data item package. Thus, the user interface 500 allows the user to visualize the difference between the two. In additional embodiments, not shown, user interfaces can be generated to allow the user to compare the determined data item package with another determined data item package. In additional embodiments, not shown, user interfaces can be generated to allow the user to sync data item packages. For example, the user may have an existing data item package open. The user can provide information identifying a previous data item package and select a feature that causes the item packaging system 140 to copy the advertisement spot assignments from the previous data item package into the existing data item package. This may allow the user to iterate on a previously created data item package in another system.

Example Process Flow

Figure 6:
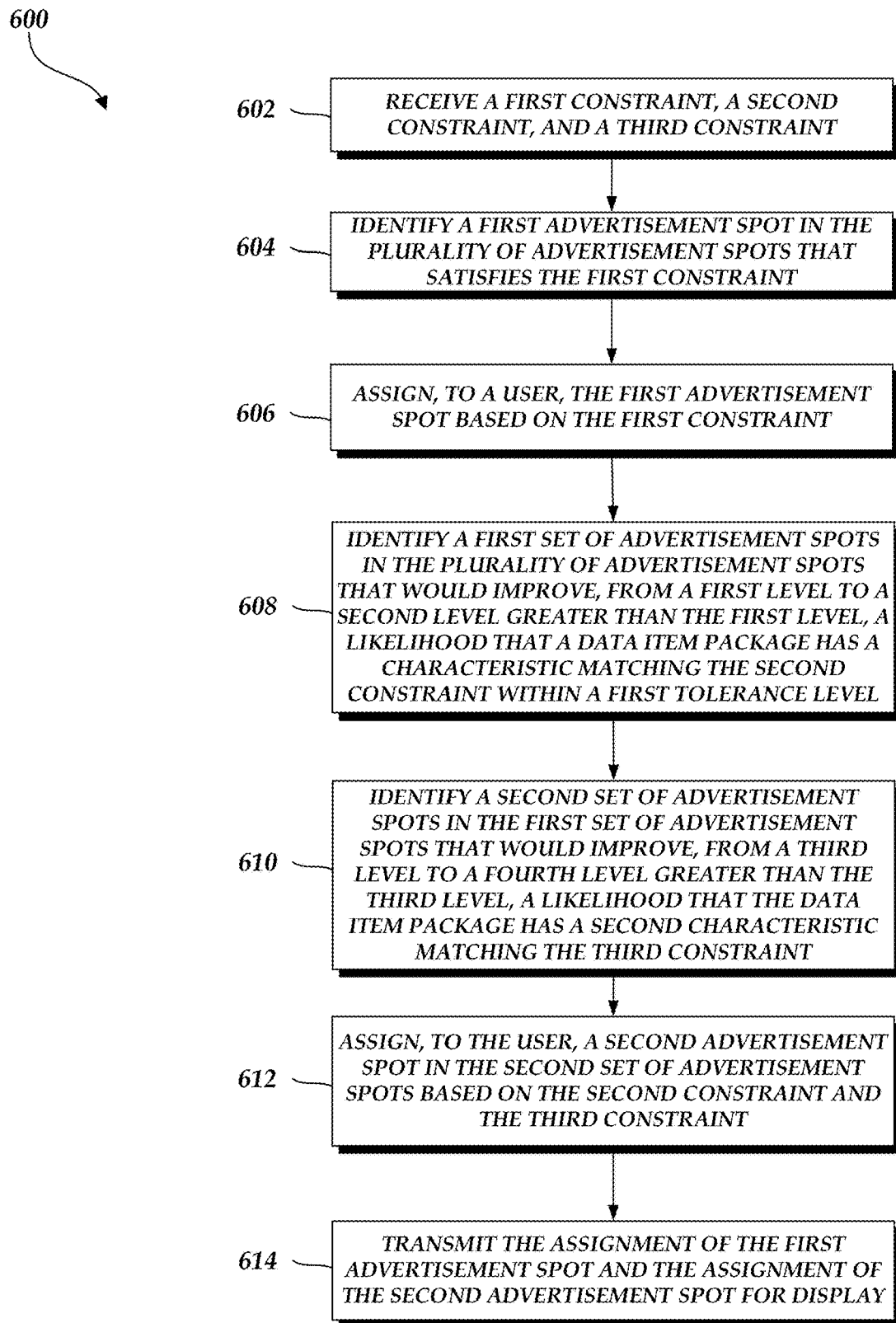
FIG. 6 is a flowchart depicting an illustrative operation of optimizing an assignment of a plurality of advertisement spots to an advertiser.

FIG. 6 is a flowchart 600 depicting an illustrative operation of optimizing an assignment of a plurality of advertisement spots to an advertiser. The method of FIG. 6 may be performed by various computing devices, such as by the item packaging system 140 described above. Depending on the embodiment, the method of FIG. 6 may include fewer and/or additional blocks and the blocks may be performed in an order different than illustrated.

In block 602, a first constraint, a second constraint, and a third constraint are received. For example, the first constraint can be that an advertisement spot associated with a particular television title must be assigned to the advertiser. The second constraint can be that a specified percentage of advertisement spots associated with a particular day of the week should be assigned to the advertiser. A first tolerance level may be associated with the second constraint such that a target percentage can range by a threshold value from the specified percentage. The third constraint can be a CPM.

In block 604, a first advertisement spot in the plurality of advertisement spots is identified that satisfies the first constraint. For example, several advertisement spots may satisfy the first constraint and the item aggregation engine 142 may identify the first such advertisement spot by analyzing available advertisement spots in chronological order.

In block 606, the first advertisement spot is assigned to a user based on the first constraint. For example, the user can be an advertiser and the first advertisement spot may be included in a data item package.

In block 608, a first set of advertisement spots in the plurality of advertisement spots is identified that would improve, from a first level to a second level greater than the first level, a likelihood that a data item package has a characteristic matching the second constraint within a first tolerance level. For example, the first tolerance level may define a range of values above and/or below the specified second constraint such that a data item package has a characteristic satisfying the second constraint if the characteristic matches any value in the range.

In block 610, a second set of advertisement spots in the first set of advertisement spots are identified that would improve, from a third level to a fourth level greater than the third level, a likelihood that the data item package has a second characteristic matching the third constraint. For example, certain advertisement spots in the first set of advertisement spots, if selected, would result in a current CPM of the incomplete data item package moving farther away from the specified CPM of the third constraint, whereas other advertisement spots in the first set of advertisement spots, if selected, would result in the current CPM of the incomplete data item package moving closer to the specified CPM of the third constraint.

In block 612, a second advertisement spot in the second set of advertisement spots is assigned to the user based on the second constraint and the third constraint. For example, second advertisement spot may be included in the data item package.

In block 614, the assignment of the first advertisement spot to the user and the second advertisement spot to the user are transmitted for display. For example, the assignment may be displayed as part of the data item package in a user interface generated by the user device 160.

Example Audience Deficiency Package User Interfaces

FIG. 7 illustrates a user interface 700 displaying a page that allows a user to select a pool of television titles that include advertisement spots that can be included in an audience deficiency package. The user interface 700 can be displayed by the user device 160 and user interface data that causes the user device 160 to display the user interface 700 can be generated by the user interface generator 146 based on information provided by the package updater 148. As illustrated in FIG. 7, the user interface 700 includes a window 705 and a channel menu button 708. The channel menu button 708 allows a user to select a specific broadcast channel, which causes the window 705 to display a list of television titles broadcast on the selected broadcast channel in table 720.

The window 705 also includes a time period menu button 710 that allows a user to filter the television titles displayed in the table 720 according to a specific time period. For example, the user may filter the displayed television titles such that the television titles to air in the next 3 weeks are displayed.

The window 705 also includes a demographic menu button 714 and a stream button 716 that allow a user to further filter the displayed television titles. For example, the user can select one of several demographics via the demographic menu button 714, which causes the table 720 to display television titles corresponding to the selected demographic. Similarly, the user can select one stream (e.g., A1, A2, etc.) via the stream button 716, which causes the table 720 to display television titles corresponding to the selected stream.

The table 720 displays television titles and, for each television title, a week that the respective television title begins airing, available advertisement spot units (where half a unit corresponds to a 15 second spot), locked advertisement spot units, and a number of expected impressions (in thousands). Via boxes to the left of the table 720, a user can select one or more television titles. Selection of a television title may cause the package updater 148 to include advertisement spots associated with the selected television title to be assigned to advertisers and be included in the audience deficiency package.

FIG. 8 illustrates a user interface 800 displaying a page that allows a user to select one or more data item packages. The user interface 800 can be displayed by the user device 160 and user interface data that causes the user device 160 to display the user interface 800 can be generated by the user interface generator 146 based on information provided by the package updater 148. As illustrated in FIG. 8, the user interface 800 includes a window 805.

The window 805 includes a conflicts button 812 that allows a user to filter the data item packages displayed in table 820 according to a conflict category associated with the data item packages. For example, data item packages may be associated with a conflict category such that advertisements associated with the same conflict category are not broadcast within the same advertisement segment. The user may filter the displayed data item packages such that the data item packages that are associated with any conflict category (e.g., auto, college, cell phone, body, movies, diaper, etc.) are displayed.

The window 805 also includes a date menu button 814, a quarter menu button 816, and a link button 818 that allow a user to further filter the displayed data item packages. For example, the user can select one of several date ranges (e.g., 2016-2017, 2015-2016, etc.) via the data menu button 814, which causes the table 820 to display data item packages corresponding to the selected date range. The user can select one of several ranges of quarters (e.g., 4Q, 4Q to 1Q, 4Q to 2Q, 4Q to 3Q, etc.) via the quarter menu button 816, which causes the table 820 to display impression data associated with the data item packages that is collected during the selected range of quarters. Similarly, the user can select on or off via the link button 818, which causes the package updater 148 to aggregate the impression deficits or surpluses of all data item packages that are linked to a given data item package and causes the table 820 to display the aggregated impression deficit or surplus.

The table 820 displays data item packages and, for each data item package, a package or deal number, a name, an identification of a linked data item package, an administrator managing the respective data item package, a demographic associated with the respective data item package, a stream associated with the respective data item package, one or more conflict categories associated with the respective data item package, a budget of the respective data item package, and an impressions deficit or surplus (in thousands, as compared with the expected number of expressions) through a time period identified by the quarter menu button 816 (e.g., through the second quarter of 2017 as depicted in FIG. 8). Via boxes to the left of the table 820, a user can select one or more data item packages. The package updater 148 may generate an audience deficiency package for the selected data item packages. After the data item packages are selected, the user can select button 806 to set constraints for one or more selected data item packages.

Figure 9B:
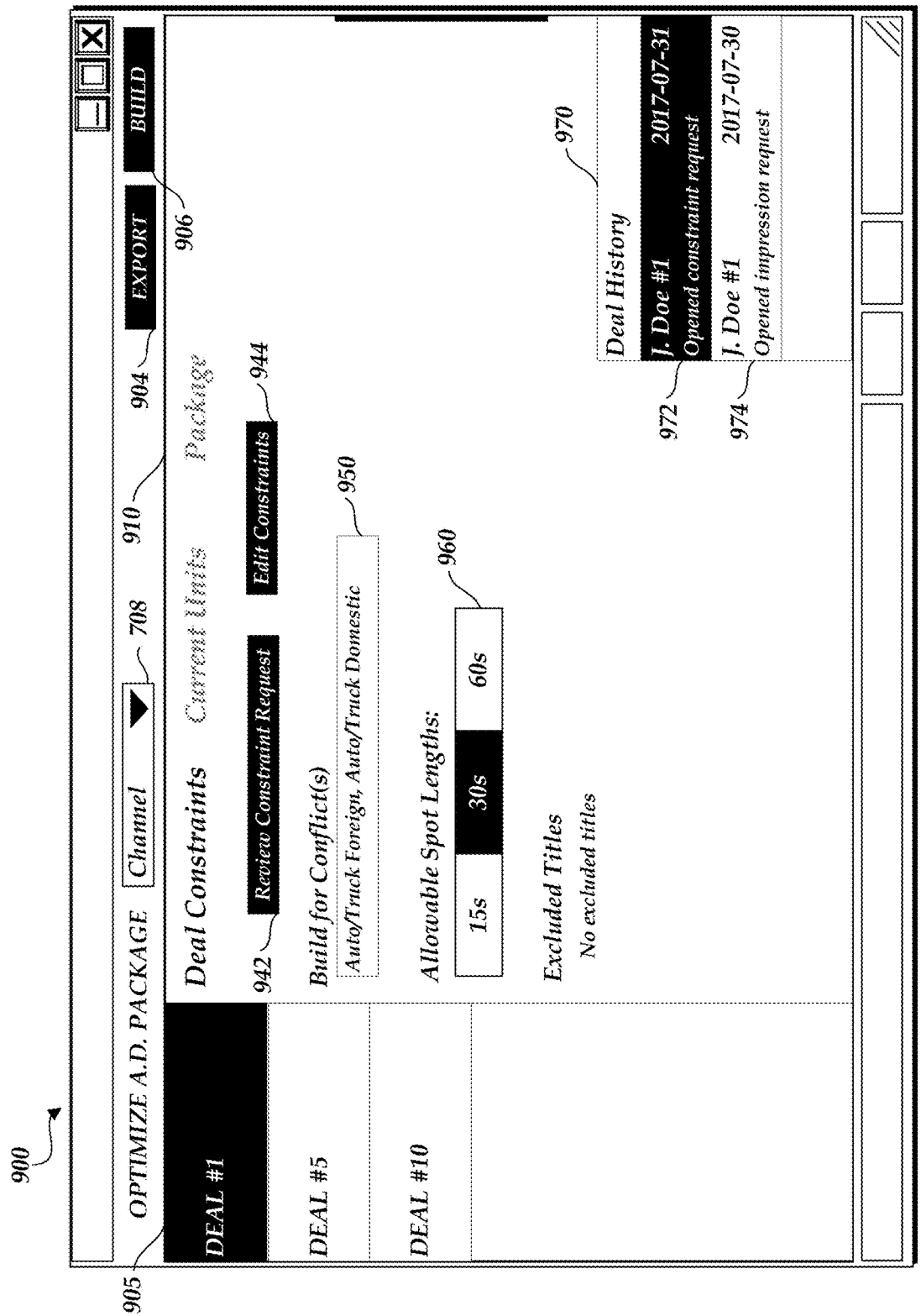

FIGS. 9A-9B illustrate a user interface 900 displaying pages that allow a user to set constraints corresponding to one or more data item packages for use in generating the audience deficiency package. The user interface 900 can be displayed by the user device 160 and user interface data that causes the user device 160 to display the user interface 900 can be generated by the user interface generator 146 based on information provided by the package updater 148. As illustrated in FIG. 9A, the user interface 900 includes a window 905 and a window 910. The window 905 displays a list of data item packages corresponding to the broadcast channel selected via the user interface 800.

Each data item package (e.g., deal) displayed in the window 905 is selectable. For example, as depicted in FIG. 9A, "Deal #1" is selected. Window 910 displays information associated with the selected data item package. For example, the window 910 includes an advertiser associated with the selected data item package, an administrator managing the selected data item package, a CPM associated with the selected data item package, a conflict category associated with the selected data item package, a demographic associated with the selected data item package, a stream associated with the selected data item package, and/or a value (e.g., 30 minutes in FIG. 9A) that indicates a time period after an advertisement spot assigned to the advertiser associated with the data item package during which another advertisement spot cannot be assigned to the advertiser (e.g., a 30 minute separation).

The window 910 further includes a box 920 that includes a table providing information related to data item packages that are linked to the selected data item package, including impression deficits or surpluses of one or more of the linked data item packages over one or more quarters. The table in box 920 may include one or more columns, such as channel, deal number, year, deal name, stream, 3Q16, 4Q16, 1Q17, 2Q17, 3Q17, etc., any number of which columns may be optional. The window 910 further includes a box 930 that includes fields that allows a user to input target distributions of advertisement spots across different categories of television shows. For example, the user may select 0% of advertisement spots to be assigned to day time television shows, 20% of advertisement spots to be assigned to fringe television shows, 25% of advertisement spots to be assigned to late night television shows, and so on. Within the box 930, a user may also be able to input a target number of impressions to be achieved for the advertiser in the audience deficiency package to be generated. The box 930 may also indicate additional information, such as target impressions and/or target distributions provided by another user (e.g., a salesperson or negotiator that is communicating directly with the advertiser, where the current user may be another employee of the content provider that does or does not communicate directly with the advertiser). The box 930 may also include a button that allows a user to interact with the target impressions and/or target distributions provided by another user (e.g., mark as fulfilled, decline request, etc.), not shown. A history of target impressions and/or target distributions provided by other users may be displayed in deal history box 970 (e.g., item 974 indicates a previous target impression and/or target distribution submitted by another user and a date of such submission).

The window 910 further includes a review constraint request button 942 that allows a user to view constraints provided by another user (e.g., the salesperson), as depicted in FIG. 9B. For example, selection of the review constraint request button 942 allows the user to view conflict categories submitted by the other user, allowable spot lengths submitted by the other user, excluded television titles selected by the other user, and/or allowable flight weeks (e.g., weeks in which advertisement spots can be assigned to the advertiser) selected by the other user. A history of constraint requests provided by other users may be displayed in the deal history box 970 (e.g., item 972 indicates a previous constraint request submitted by another user and a date of such submission). The deal history box 970 may also allow a user to enter free-text comments relating to item 972, item 974, any other history of target impressions and/or target distributions, and/or any other history of constraint requests.

The window 910 also includes an edit constraints button 944 that allows a user to edit the constraints to be used when generating the audience deficiency package. For example, selection of the edit constraints button 944 allows a user to submit conflict categories (which are then displayed in field 950), select allowable spot lengths (which are then displayed in box 960), select excluded television titles (which are then displayed in window 910), and/or select allowable flight weeks.

Once the target impressions, target distributions, and/or other constraints are set, the user can select build button 906 that, when selected, causes the package updater 148 to receive an instruction directly or indirectly from the user device 160 that causes the package updater 148 to generate the audience deficiency package using at least the user-selected information. The user can further export the target impressions, target distributions, other constraints, and/or generated audience deficiency package (e.g., as an electronic document, spreadsheet, etc.) by selecting export button 904.

FIG. 9C illustrates a user interface 950 displaying a page that allows a user to view a generated audience deficiency package and compare the generated audience deficiency package with the constraints set by the user. The user interface 950 can be displayed by the user device 160 and user interface data that causes the user device 160 to display the user interface 900 can be generated by the user interface generator 146 based on information provided by the package updater 148.

As illustrated in FIG. 9C, the window 910 once again includes the box 930. However, the box 930 includes additional information as compared with the box 930 in FIG. 9A. In particular, the box 930 further includes information indicating the number of impressions and the distribution of advertisement spots across different categories of television shows included in the audience deficiency package. Thus, the user can, in a single location, compare the target impressions and/or distributions set by the user, the target impressions and/or distributions set by another user, and/or the impressions and/or distributions included in the audience deficiency package. By including such information in a single location in a single user interface, the user interface generator 146 generates fewer pages, thereby conserving computing resources. In addition, by including such information in a single location in a single user interface, the packaging network service 130 and/or item packaging system 140 receive and serve fewer network page requests originating from the user device 160, thereby conserving computing resources.

The window 910 may further include details of the audience deficiency package, as provided in table 990. For example, table 990 includes, in each row, information identifying a television title in which advertisement spot(s) are assigned, a week that the television title is first broadcast, an air date of the television title, a number of advertisement spot units included within the television title, a number of impressions associated with the television title, a value associated with the television title and assigned advertisement spots (e.g., earned revenue), percentage rate card (e.g., percentage of a maximum price that an advertiser pays for an advertisement spot), and/or the like. If an advertiser bought the television title listed in a row of the table 990 in the original data item package, then the table 990 (e.g., in the corresponding row) may display an indication that the advertiser previously bought the television title in the original data item package.

As described above, in some embodiments, the package updater 148 cannot generate the audience deficiency package according to the specified selections and/or constraints. Thus, the package updater 148 may generate a notification that is displayed in the user interface 900 (e.g., as a pop-up window, in a separate portion of the window 910, etc.), not shown, indicating how the selections and/or constraints can be modified in a way that allows the audience deficiency package to be generated. For example, the package updater 148 may determine, while iterating through the advertisement spots, that one or more advertisement spots cannot be assigned to any advertiser given the constraints and that all other advertisement spots have been assigned without all impression targets being met. The package updater 148 may identify the constraint of an advertiser that does not have its impression target met that is preventing the unassigned advertisement spot(s) from being assigned to the advertiser and what modification to the constraint would allow the unassigned advertisement spot(s) to be assigned to the advertiser. The package updater 148 can use this identification to then generate a notification stating that the audience deficiency package can be generated if the identified constraint is modified in a manner as identified by the package updater 148 that would allow the unassigned advertisement spot(s) to be assigned to the advertiser. The user interface generator 146 can then include the generated notification in the user interface data such that the generated notification is displayed in the user interface 900.

In some embodiments, the user may pre-select an option that allows the package updater 148 to automatically implement the modifications suggested in the notification. For example, the user interface 900 may display the notification along with a message indicating that unless the user selects otherwise, the package updater 148 will automatically make the suggested modifications and generate a new audience deficiency package. Thus, the package updater 148 may evaluate the selections and/or constraints made by a user and automatically make modifications to these selection and/or constraints in order to generate more optimized audience deficiency packages. Accordingly, the package updater 148 improves the functionality of the computing system itself (e.g., the item packaging system 140) via the automatic modification and audience deficiency package generation process.

Once the audience deficiency package is generated, the package details can be implemented and the assigned advertisement spots can be filled with corresponding advertisements for broadcast.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
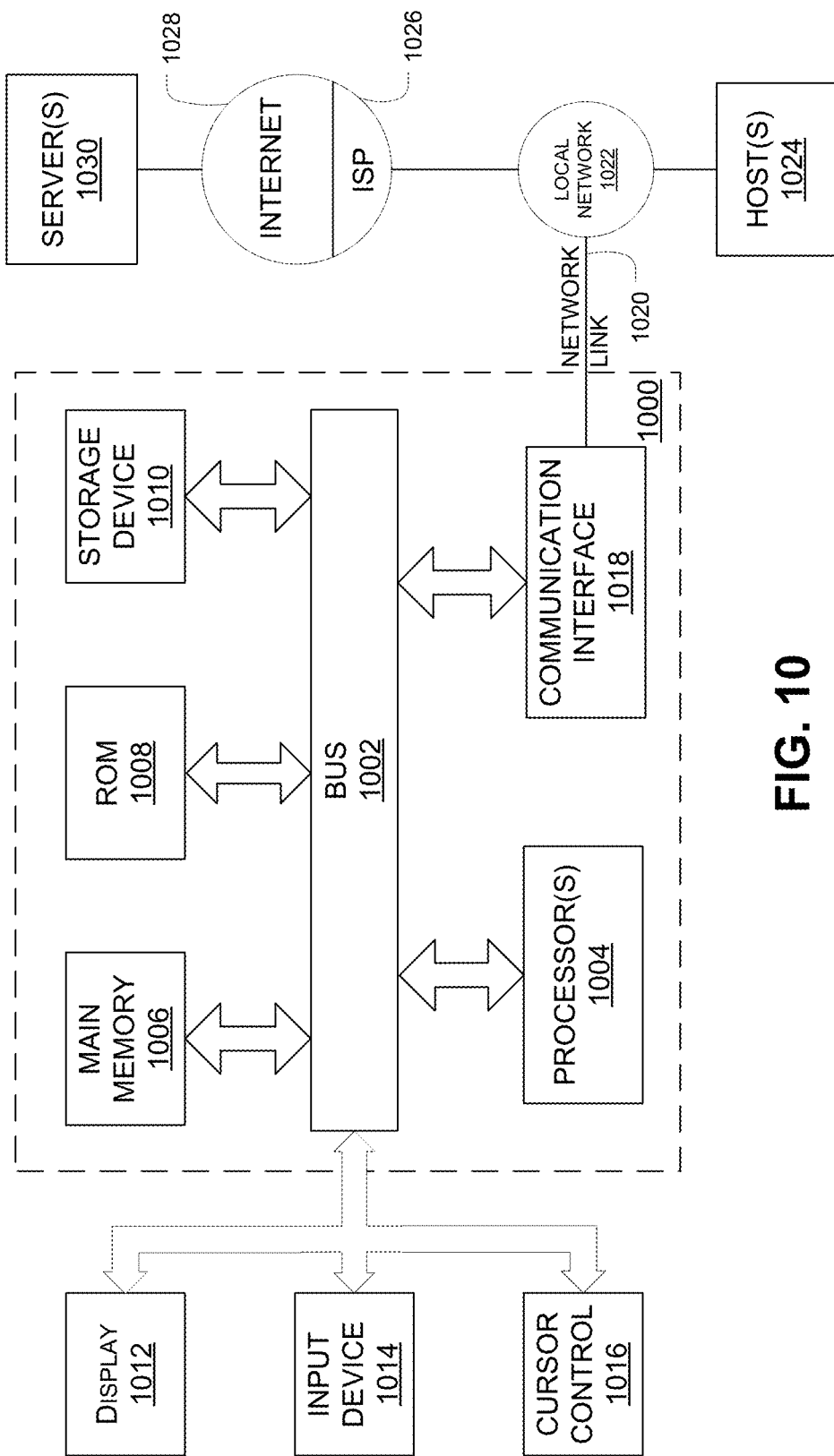
FIG. 10 illustrates a computer system with which certain methods discussed herein may be implemented, according to one embodiment.

For example, FIG. 10 is a block diagram that illustrates a computer system 1000 upon which an embodiment may be implemented. For example, any of the computing devices discussed herein may include some or all of the components and/or functionality of the computer system 1000.

Computer system 1000 includes a bus 1002 or other communication mechanism for communicating information, and a hardware processor, or multiple processors, 1004 coupled with bus 1002 for processing information. Hardware processor(s) 1004 may be, for example, one or more general purpose microprocessors.

Computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions. Main memory 1006 may also store cached data, such as zoom levels and maximum and minimum sensor values at each zoom level.

Computer system 1000 further includes a read only memory (ROM) 708 or other static storage device coupled to bus 1002 for storing static information and instructions for processor 1004. A storage device 1010, such as a magnetic disk, optical disk, or USB thumb drive (Flash drive), etc., is provided and coupled to bus 1002 for storing information and instructions. For example, the storage device 1010 may store measurement data obtained from a plurality of sensors.

Computer system 1000 may be coupled via bus 1002 to a display 1012, such as a cathode ray tube (CRT) or LCD display (or touch screen), for displaying information to a computer user. For example, the display 1012 can be used to display any of the user interfaces described herein with respect to FIGS. 2 through 9C. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieve and execute the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

Terminology

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry. The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating or otherwise vexing to user.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer-implemented method performed by a computing device comprising one or more hardware computer processors, the method comprising:

retrieving, by an item aggregation engine of an item packaging system through a network, one or more data items from a user data store, wherein the user data store comprises a database of available inventory;

retrieving, by the item aggregation engine through the network, one or more data items from an entity data store, wherein the entity data store comprises a database storing historical data item packages associated with one or more entities;

receiving, by the item aggregation engine through the network, a first constraint, a second constraint, and a third constraint from a user device associated with a user;

parsing, by the item aggregation engine, the received constraints to determine that the first constraint is less flexible than the second constraint;

identifying, by the item aggregation engine, a first data unit from a plurality of data units that satisfies the first constraint;

identifying, by the item aggregation engine, a first set of data units from the plurality of data units that satisfies the second constraint and is within a tolerance level associated with the second constraint or exceeds a minimum requirement of the second constraint;

identifying, by the item aggregation engine, a second set of data units from the first set of data units that matches the third constraint or exceeds a minimum requirement of the third constraint;

determining, by the item aggregation engine, one or more alternate data item packages in parallel based on different tolerance levels distinct from the tolerance level associated with the second constraint;

transmitting, by a recommendation engine of the item packaging system, instructions to a user device to display, in a first window of a user interface, a graphical summary of a data item package; and displaying, in a second window that overlaps the first window, a recommendation for changing the tolerance level of the second constraint to a different tolerance level associated with one of the alternate data item packages, wherein the recommended change increases a value of the data item package.

2. The computer-implemented method of claim 1, wherein the value of the data item package is based on a cost of one or more data items included in the data item package.

3. The computer-implemented method of claim 1, wherein adding, to the data item package, the first data unit further comprises generating the data item package that includes the first data unit.

4. The computer-implemented method of claim 1, wherein the first constraint is based on another constraint in a historical data item package.

5. The computer-implemented method of claim 1, wherein the first data unit is one of an advertisement spot, a network-based advertisement, a billboard, a cover of a video game, an announcement during a sporting event, a consumer product, or an insurance plan.

6. A computing system comprising:
a hardware computer processor; and
a non-transitory computer readable medium having executable software instructions stored thereon, wherein the executable instructions are configured to implement:
an item aggregation engine configured to:
retrieve, through a network, one or more data items from a user data store, wherein the user data store comprises a database of available inventory;
retrieve, through the network, one or more data items from an entity data store, wherein the entity data store comprises a database storing historical data item packages associated with one or more entities;
receive, through the network, a first constraint, a second constraint, and a third constraint from a user device associated with a user;
parse the received constraints to determine that the first constraint is less flexible than the second constraint;
identify a first data unit from a plurality of data units that satisfies the first constraint;
identify a first set of data units from the plurality of data units that satisfies the second constraint and is within a tolerance level associated with the second constraint or exceeds a minimum requirement of the second constraint;
identify a second set of data units from the first set of data units that matches the third constraint or exceeds a minimum requirement of the third constraint; and
determine one or more alternate data item packages in parallel based on different tolerance levels distinct from the tolerance level associated with the second constraint; and
a recommendation engine configured to:
transmit instructions to a user device to display, in a first window of a user interface, a graphical summary of a data item package; and
display, in a second window that overlaps the first window, a recommendation for changing the tolerance level of the second constraint to a different tolerance level associated with one of the alternate data item packages, wherein the recommended change increases a value of the data item package.

7. The computing system of claim 6, wherein the value of the data item package is based on a cost of one or more data items included in the data item package.

8. The computing system of claim 6, wherein adding, to the data item package, the first data unit further comprises generating the data item package that includes the first data unit.

9. The computing system of claim 6, wherein the first constraint is based on another constraint in a historical data item package.

10. The computing system of claim 6, wherein the first data unit is one of an advertisement spot, a network-based advertisement, a billboard, a cover of a video game, an announcement during a sporting event, a consumer product, or an insurance plan.

* * * * *